United States Patent
Julstrom

(10) Patent No.: US 9,859,990 B2
(45) Date of Patent: Jan. 2, 2018

(54) TELECOIL HUM FILTER

(71) Applicant: ETYMOTIC RESEARCH, INC., Elk Grove Village, IL (US)

(72) Inventor: Stephen D. Julstrom, Chicago, IL (US)

(73) Assignee: ETYMOTIC RESEARCH, INC., Elk Grove Village, IL (US)

( * ) Notice: Subject to any disclaimer, the term of this patent is extended or adjusted under 35 U.S.C. 154(b) by 0 days.

(21) Appl. No.: 15/141,247

(22) Filed: Apr. 28, 2016

(65) Prior Publication Data

US 2016/0323043 A1 Nov. 3, 2016

Related U.S. Application Data

(60) Provisional application No. 62/154,191, filed on Apr. 29, 2015.

(51) Int. Cl.
H04B 15/00 (2006.01)
H04R 3/04 (2006.01)
H04R 25/00 (2006.01)

(52) U.S. Cl.
CPC ......... *H04B 15/005* (2013.01); *H04R 25/554* (2013.01); *H04R 3/04* (2013.01); *H04R 25/505* (2013.01); *H04R 2225/49* (2013.01); *H04R 2225/51* (2013.01)

(58) Field of Classification Search
CPC .... H04R 25/554; H04R 2225/49; H04R 3/04; H04R 2225/51; H04R 25/505; H04B 15/005
USPC ............. 381/94.6, 94.1, 317, 312, 331, 332; 600/25; 181/129, 128, 126; 330/149; 455/296
See application file for complete search history.

(56) References Cited

U.S. PATENT DOCUMENTS

| | | | | |
|---|---|---|---|---|
| 4,122,398 A | * | 10/1978 | Dunn | H03H 11/1291 330/107 |
| 5,577,099 A | * | 11/1996 | Clement | H04M 3/28 324/133 |
| 5,680,467 A | * | 10/1997 | Hansen | H04R 25/453 381/312 |
| 5,815,579 A | * | 9/1998 | Boyden | H04R 3/12 381/301 |

(Continued)

FOREIGN PATENT DOCUMENTS

EP 0843427 * 5/1998

*Primary Examiner* — Vivian Chin
*Assistant Examiner* — Con P Tran
(74) *Attorney, Agent, or Firm* — McAndrews, Held & Malloy, Ltd.

(57) ABSTRACT

A system and/or method is provided for enhanced listening of audio signals acquired via a telecoil by performing hum filtering. The system may include a telecoil and a telecoil hum filter. The telecoil hum filter may include a comb notch filter. The comb notch filter may include a delay module and a comb notch filter summing module. The telecoil may be operable to receive a magnetic signal and convert the magnetic signal to an input audio signal. The delay module of the comb notch filter may be configured to generate a delayed signal by applying a delay to the input audio signal. The delay may be based on a fundamental hum frequency. The comb notch filter summing module may be configured to generate a comb notch filter output signal by adding the input audio signal and the delay signal.

19 Claims, 16 Drawing Sheets

(56) References Cited

U.S. PATENT DOCUMENTS

2004/0135570 A1* 7/2004 Kurth ..................... H03G 5/04
                                                    324/66
2009/0295366 A1* 12/2009 Cehelnik ................ G06F 3/017
                                                   324/76.11

* cited by examiner

TELECOIL HUM FILTER

CROSS-REFERENCE TO RELATED APPLICATIONS/INCORPORATION BY REFERENCE

The present application claims priority under 35 U.S.C. §119(e) to provisional application Ser. No. 62/154,191 filed on Apr. 29, 2015, entitled "Telecoil Hum Filter." The above referenced provisional application is hereby incorporated herein by reference in its entirety.

FIELD

Certain embodiments of the invention relate to hearing aids and cochlear implants having a telecoil. More specifically, certain embodiments of the invention relate to a method and system for enhanced listening of audio signals acquired via a telecoil by performing hum filtering.

BACKGROUND

Telecoils, also known as t-coils, are coils of wire wrapped around a core that induce an electric current when in the presence of a changing magnetic field. Telecoils are used as an alternate or supplemental input device for hearing aids and cochlear implants. Originally, telecoils in hearing aids and cochlear implants were used to pick up electromagnetic signals naturally generated by older telephones having speakers driven by powerful electromagnets. More recently, hearing aid compatible phones may include additional magnetics to generate the magnetic fields. Moreover, telecoils may be used with hearing assistive technology, such as hearing loops, which can improve listenability in meetings, classrooms, theaters, churches, and the like. For example, a hearing loop may be a room loop, neck loop, or silhouette that receives audio signals and passes them through an induction loop to create a magnetic induction field detectable by nearby telecoils. The magnetic signals received by a telecoil are converted to electrical audio signals and provided to a user of the hearing aid or cochlear implant. In many cases, using a telecoil may provide an improved listening experience because, for example, by turning off the normal hearing aid microphone, the user receives the desired audio signal without other interfering background noise surrounding the user.

A common problem with telecoils is that, in addition to the pickup of desired magnetic signals, the telecoils are also sensitive to stray magnetic hum fields that are often present in various indoor and outdoor environments. For example, some power lines, building wiring, fluorescent lights, dimmer switches, heavy electrical equipment, and the like may generate electromagnetic interference. The electromagnetic interference may generally occur at power frequencies (e.g., 60 Hz in North America and 50 Hz in Europe and most of Asia) and their harmonics.

FIG. 1 is a graph of the frequency response of exemplary stray magnetic hum fields measured at various locations in an indoor environment. Referring to FIG. 1, it can be seen that the strength of the harmonics decreases with frequency and that the even harmonics (120, 240, 360 Hz, etc.) are virtually absent. The spectrum is dominated by the odd harmonics (60, 180, 300 Hz, etc.), resulting from symmetrical distortion of the 60 Hz fundamental.

A telecoil circuit, as typically implemented, does not respond equally to all these frequencies. FIG. 2 is a graph of the frequency response of exemplary stray magnetic hum fields picked up by a typical telecoil at the various locations in the indoor environment of FIG. 1. Referring to FIG. 2, the typical telecoil frequency response rolls the spectrum off at 6 dB/octave below 1 kHz.

Further, the sensitivity of an ear, whether impaired and corrected or not, is not uniform with frequency, especially at quieter listening levels. FIG. 3 is a graph of the frequency response of one of the exemplary stray magnetic hum fields as picked up by a typical telecoil at the location in the indoor environment of FIG. 2 and the frequency response of the one exemplary stray magnetic hum field as perceived by a typical hearing aid user based on an applied weighting curve. Referring to FIG. 3, a subjective weighting curve, drawn from the spectral weighting defined in ANSI standard C63.19 for the measurement of cellphone-generated interference, has been applied to the exemplary stray magnetic hum field (labeled as "Unweighted hum") to generate a spectrum (labeled as "HA-weighted hum") as perceived by a typical hearing aid user.

While the telecoil frequency response and the subjective weighting reduce the relative effect of the lower hum frequencies, 180 Hz in particular still appears dominant. Prior efforts at reducing the subjective annoyance of the hum by filtering off low frequencies below 200 or 300 Hz have not been satisfactory, however, because the higher "buzz" frequencies remain untouched. These harmonics, from 300 Hz to roughly 1 kHz are directly within the voice band. Sonion Microtronic sells amplified telecoils that include an extra roll-off below 217 Hz, which provides essentially no positive subjective effect. A previous prototyped attempt by Etymotic Research included a fourth order 320 Hz high-pass filter that effectively reduced the dominant 180 Hz component, but left untouched the audible higher voice band harmonics.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY

A system and/or method is provided for enhanced listening of audio signals acquired via a telecoil by performing hum filtering, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 9 is a block diagram showing the relationship between a first portion of a circuit diagram illustrated in FIG. 9A and a second portion of the circuit diagram illustrated in FIG. 9B, in accordance with various embodiments.

DETAILED DESCRIPTION

Figure 1:
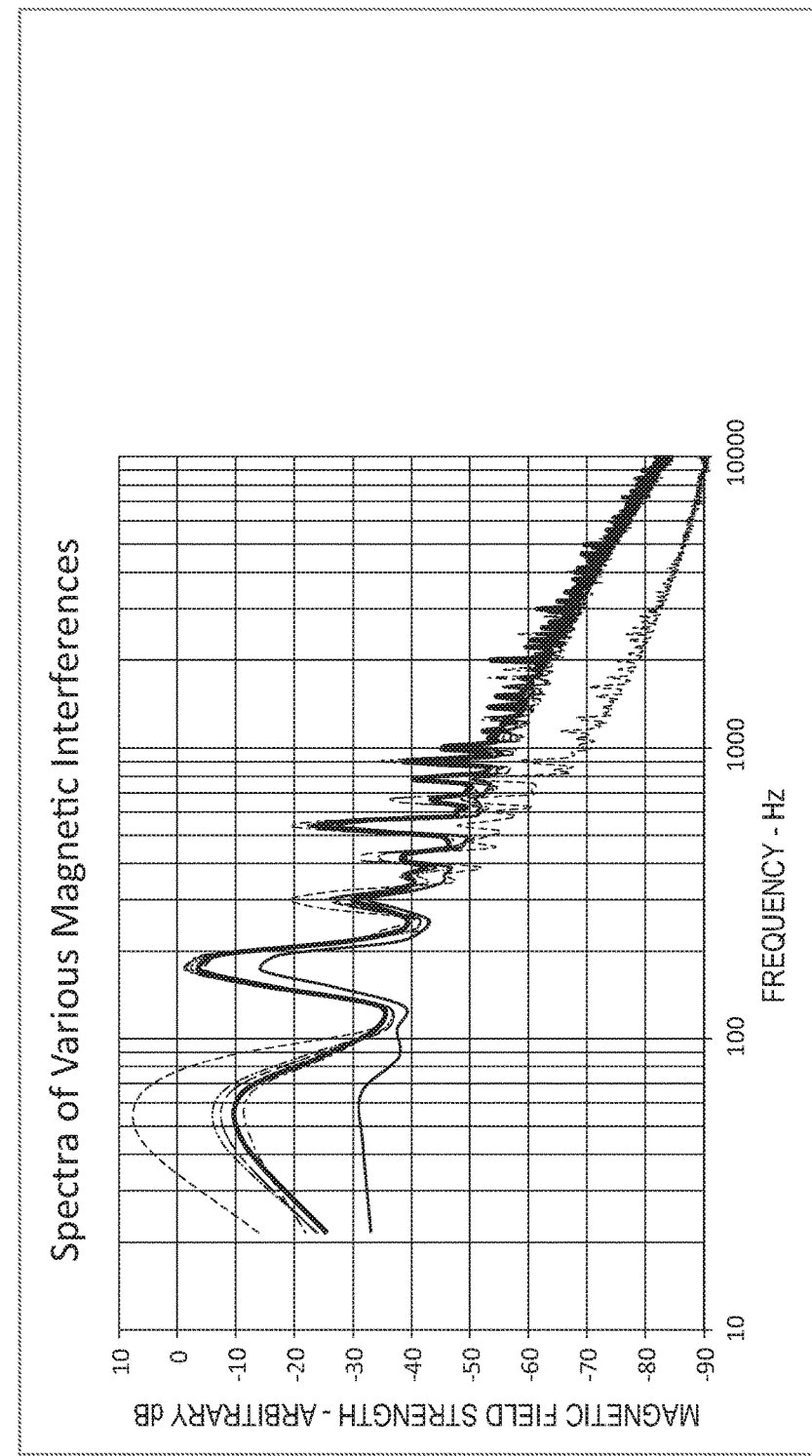
FIG. 1 is a graph of the frequency response of exemplary stray magnetic hum fields measured at various locations in an indoor environment.
Figure 2:
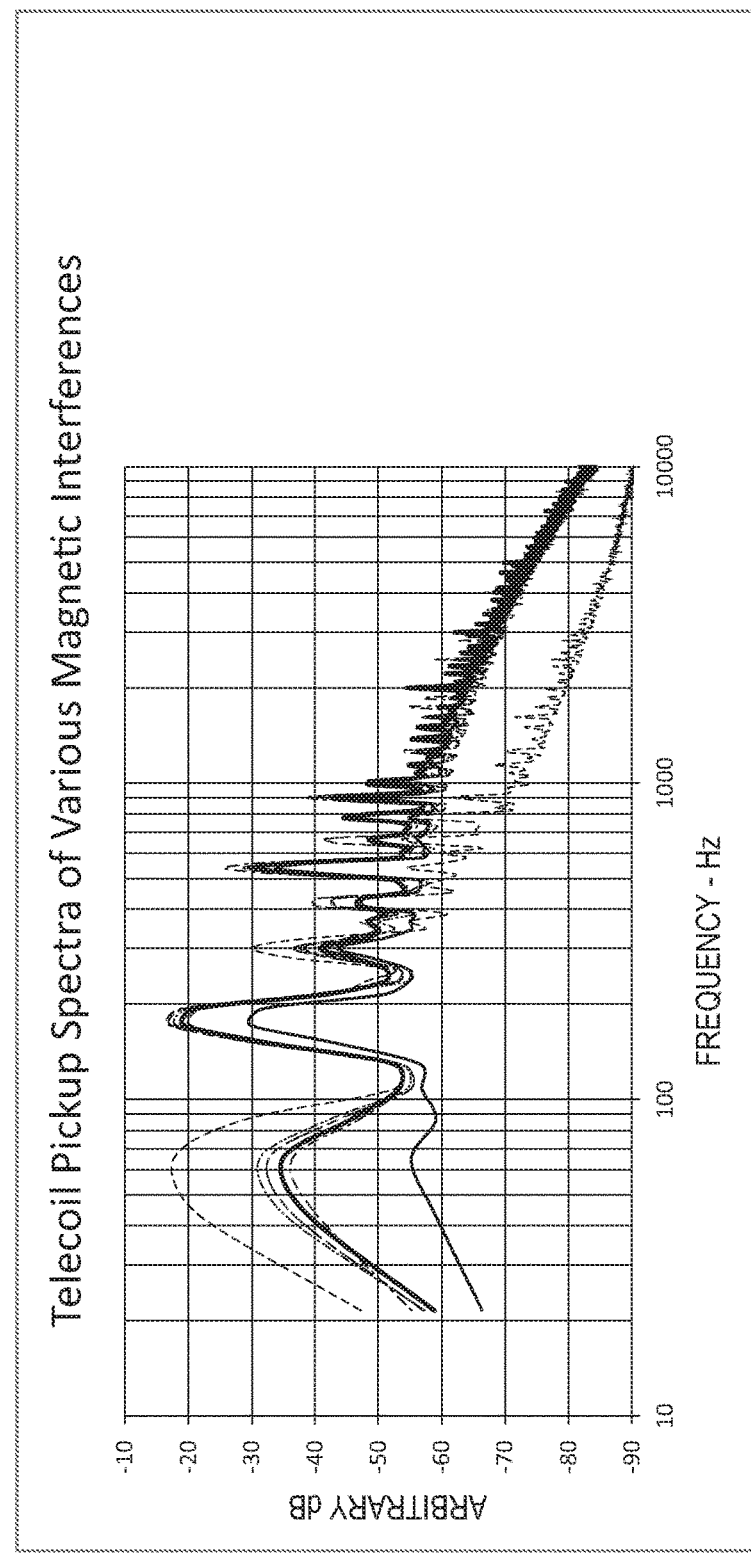
FIG. 2 is a graph of the frequency response of exemplary stray magnetic hum fields picked up by a typical telecoil at the various locations in the indoor environment of FIG. 1.

Certain embodiments may be found in a method and system for providing enhanced listening of audio signals acquired via a telecoil by performing hum filtering. Various aspects have the technical effect of substantially eliminating hum corresponding with power frequencies and their harmonics in an audio signal. For example, the method and system may be operable to substantially eliminate hum by generating sharp nulls in a telecoil circuit frequency response at particular harmonic frequencies through comb filtering. Moreover, certain embodiments have the technical effect of minimizing audible artifacts by reducing filtering with increasing frequency. Furthermore, various embodiments have the technical effect of automatically inserting or removing the telecoil hum filtering based on an automatic determination of need. Additionally, certain embodiments have the technical effect of automatically detecting and applying the appropriate notch frequency (e.g., 50 Hz or 60 Hz).

The foregoing summary, as well as the following detailed description of certain embodiments will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., processors or memories) may be implemented in a single piece of hardware (e.g., a general purpose signal processor or a block of random access memory, hard disk, or the like) or multiple pieces of hardware. Similarly, the programs may be stand-alone programs, may be incorporated as subroutines in an operating system, may be functions in an installed software package, and the like. It should be understood that the various embodiments are not limited to the arrangements and instrumentality shown in the drawings. It should also be understood that the embodiments may be combined, or that other embodiments may be utilized and that structural, logical and electrical changes may be made without departing from the scope of the various embodiments of the present invention. The following detailed description is, therefore, not to be taken in a limiting sense, and the scope of the present invention is defined by the appended claims and their equivalents.

As used herein, an element or step recited in the singular and proceeded with the word "a" or "an" should be understood as not excluding the plural of the elements or steps, unless such exclusion is explicitly stated. Furthermore, references to "an embodiment," "one embodiment," "a representative embodiment," "an exemplary embodiment," "various embodiments," "certain embodiments," and the like are not intended to be interpreted as excluding the existence of additional embodiments that also incorporate the recited features. Moreover, unless explicitly stated to the contrary, embodiments "comprising," "including," or "having" an element or a plurality of elements having a particular property may include additional elements not having that property.

Moreover, although certain embodiments in the foregoing description may describe the telecoil hum filtering being performed in a hearing aid, for example, unless so claimed, the scope of various aspects of the present invention should not be limited to hearing aids and may additionally and/or alternatively be applicable to any suitable assistive hearing device, such as a cochlear implant and the like.

Furthermore, the term processor or processing unit, as used herein, refers to any type of processing unit that can carry out the required calculations needed for the invention, such as single or multi-core: CPU, Graphics Board, DSP, FPGA, ASIC or a combination thereof.

Figure 4:
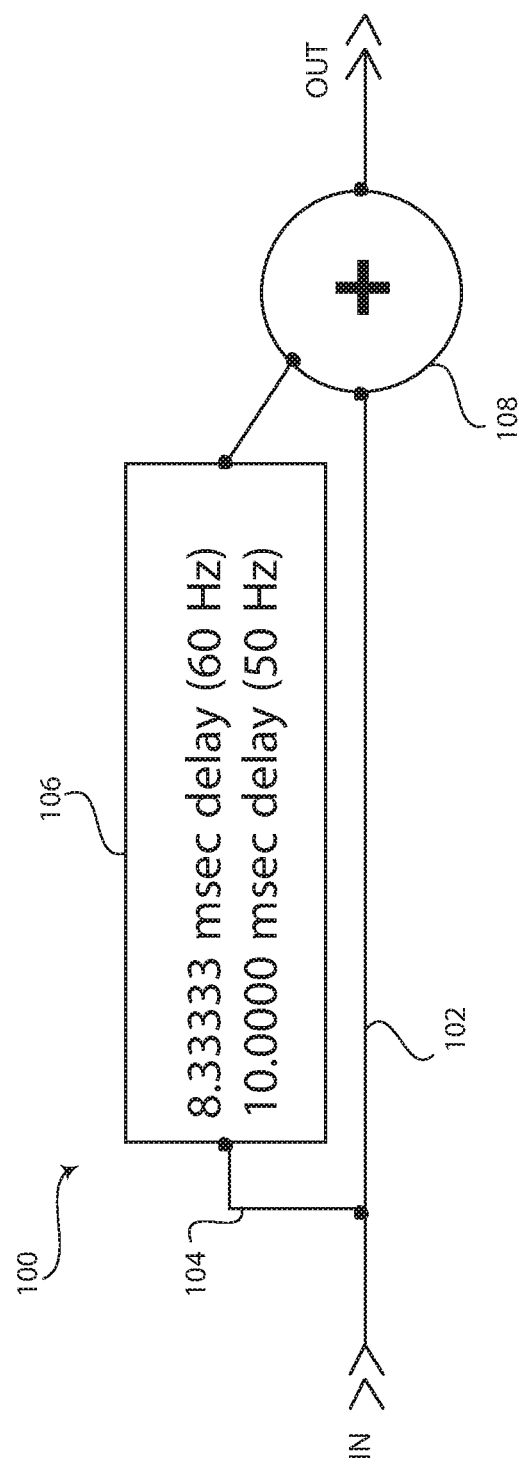
FIG. 4 is a block diagram of an exemplary comb notch filter having a delay module, the exemplary comb notch filter being configured to provide enhanced listening of audio signals acquired via a telecoil by filtering hum, in accordance with various embodiments.

FIG. 4 is a block diagram of an exemplary comb notch filter 100 having a delay module 106, the exemplary comb notch filter 100 being configured to provide enhanced listening of audio signals acquired via a telecoil by filtering hum, in accordance with various embodiments. Referring to FIG. 4, the comb notch filter 100 comprises an input, an output, a main signal path 102, a side signal path 104, a delay module 106, and a summing module 108.

The delay module 106 may comprise suitable logic, circuitry, interfaces and/or code that may be operable to delay the signal received at the input of the comb notch filter 100 by a predetermined amount of time. For example, the delay module 106 may comprise a digital delay line as described below with reference to FIG. 6. As another example, the delay module 106 may comprise an analog delay line, such as a bucket-brigade device as described below with reference to FIGS. 9, 9A, and 9B. In view of the dominance of the odd hum harmonics, the delay module 106 is configured to provide a predetermined amount of delay based on the fundamental hum frequency (e.g., 50 Hz in Europe and most of Asia or 60 Hz in North America). In various embodiments, the delay provided by the delay module 106 may be based on the following formula:

$$\text{Delay} = \frac{1}{2 * freq}$$

where freq is the fundamental hum frequency. Accordingly, in North America the delay may be configured as 8.33 msec based on the 60 Hz fundamental hum frequency and the delay in Europe can be configured as 10 msec based on the 50 Hz fundamental hum frequency. In various embodiments, an automatic judgement of whether 50 Hz or 60 Hz filtering is appropriate could be made by switching between the two possibilities and comparing the results.

The summing module 108 may comprise suitable logic, circuitry, interfaces and/or code that may be operable to add the delayed signal provided by the delay module 106 on the side signal path 104 with the input signal received on the main signal path 102. The hum filtered output of the summing module 108 may be provided to hearing aid or cochlear implant processing devices for further processing before converting the audio signal to sound at a receiver.

Figure 10:
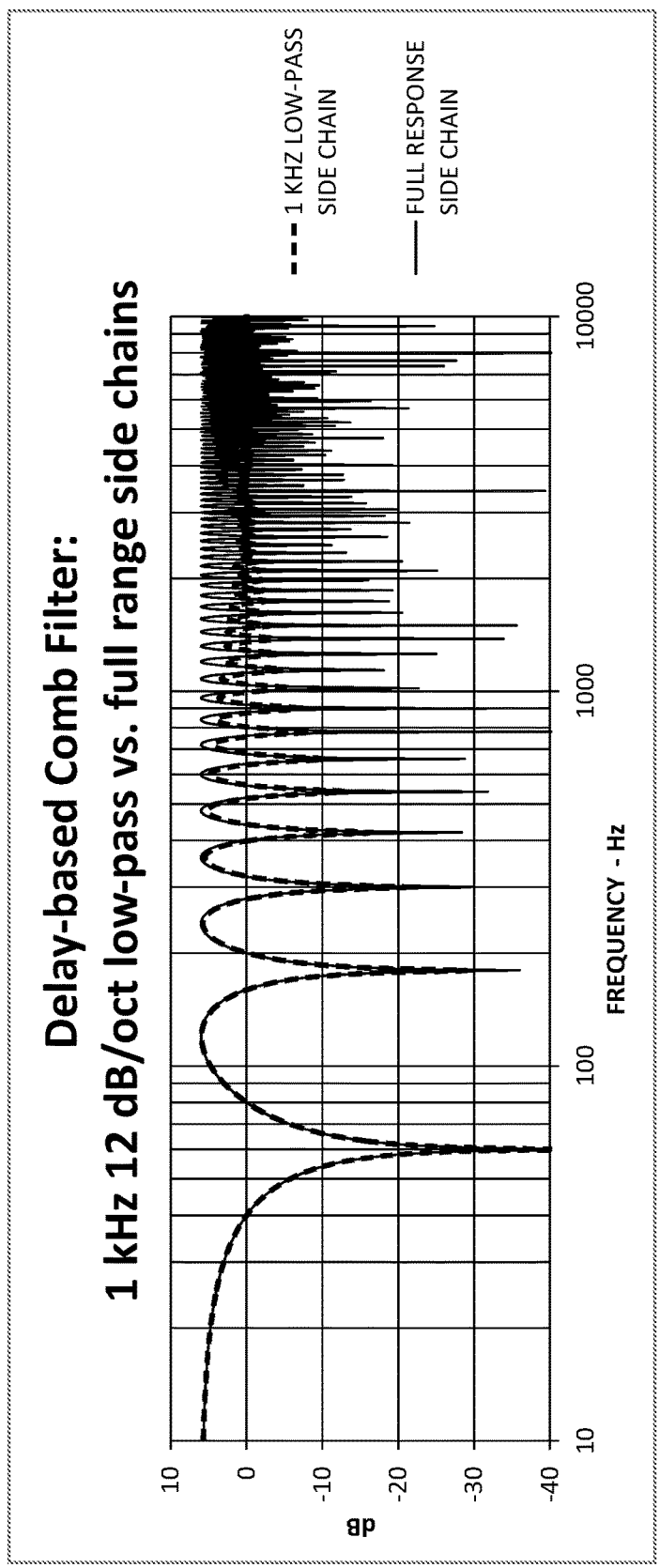
FIG. 10 is a graph of the frequency response generated by the comb notch filter of FIG. 4 and the frequency response generated by the telecoil hum filter of FIG. 8, in accordance with exemplary embodiments.

The comb notch filter 100 of FIG. 4 generates sharp nulls in the telecoil circuit frequency response at the odd harmonic frequencies of interest to produce the hum filtered output. The sharp attenuation notches at the odd harmonic hum frequencies produced by the comb notch filter 100 of FIG. 4 is illustrated in FIG. 10. Referring to FIG. 10, the sharp nulls or attenuation notches are shown as the "full response side chain." Although the generated sharp nulls are also applied to the desired audio signal pickup, the subjective effect is benign. This can be explained to a great extent by the relative tolerance of the ear to narrow dips in the frequency response of a system, in contrast to the relative intolerance of the ear to peaks as documented in R. Bucklein, "The audibility of Frequency Response Irregularities", reprinted in JAES, Vol. 29, No. 3, March 1981, which is hereby incorporated herein by reference in its entirety.

Figure 5:
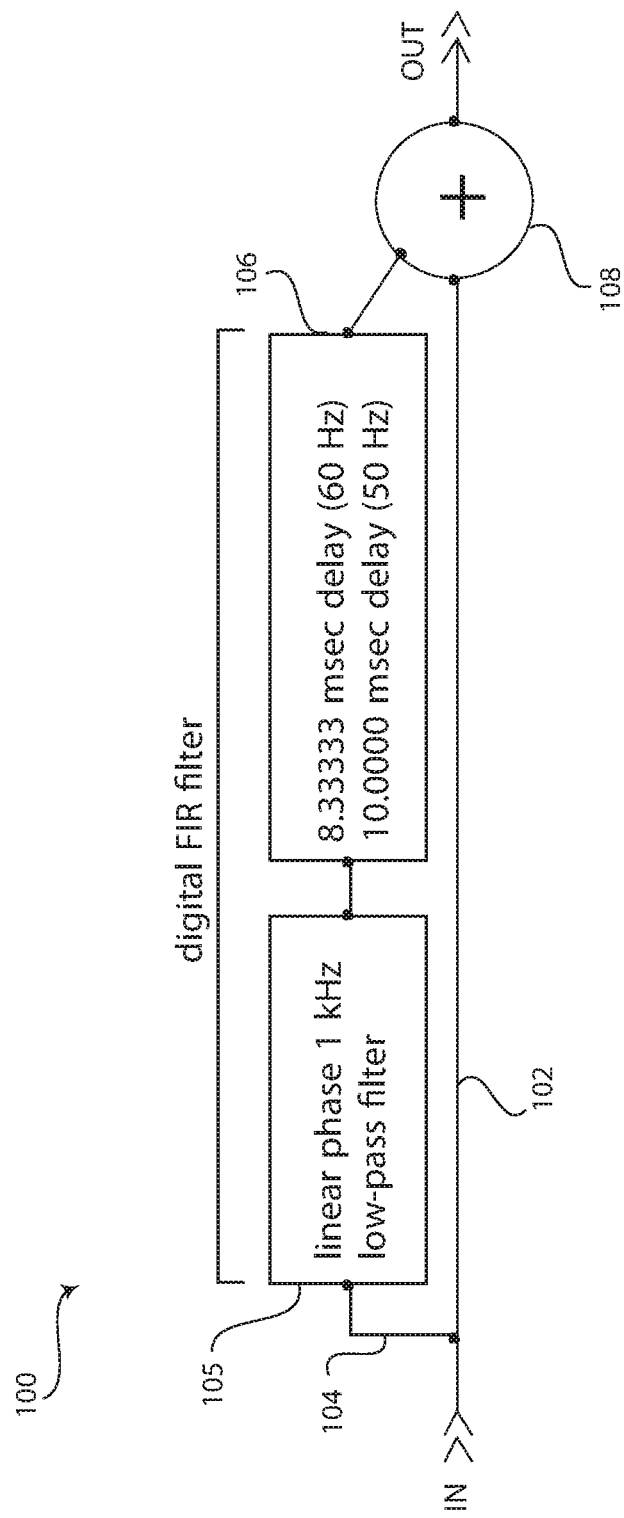
FIG. 5 is a block diagram of an exemplary comb notch filter having a low-pass filter and a delay module, the exemplary comb notch filter being configured to provide enhanced listening of audio signals acquired via a telecoil by filtering hum, in accordance with various embodiments.

FIG. 5 is a block diagram of an exemplary comb notch filter 100 having a low-pass filter 105 and a delay module 106, the exemplary comb notch filter 100 being configured to provide enhanced listening of audio signals acquired via a telecoil by filtering hum, in accordance with various embodiments. Referring to FIG. 5, the comb notch filter 100 comprises an input, an output, a main signal path 102, a side signal path 104, a low-pass filter 105, a delay module 106, and a summing module 108.

The low-pass filter 105 may comprise suitable logic, circuitry, interfaces and/or code that may be operable to cut off frequencies above 1 kHz, or any suitable cut-off frequency, of the signal received at the input of the comb notch filter 100. Although FIG. 5 illustrates the low-pass filter 105 positioned before the delay module 106, for example, it is contemplated that the low-pass filtering may occur, before, after, before and after, and/or simultaneously with the delay provided by the delay module 106. In some cases, a minor metallic character may still be detected by a user of the comb filter 100 illustrated in FIG. 4. The minor metallic character may be minimized and essentially eliminated by removing the comb-filtering from the higher frequencies where the comb-filtering may not be needed. Referring again to FIG. 5, the delayed signal is cut off above 1 kHz, or any suitable cut-off frequency, by a linear phase filter, maintaining the pure time delay characteristic of the side chain path 104. In various embodiments, the low-pass filter 105 can be implemented by a finite impulse response (FIR) filter that also exhibits the appropriate delay.

The delay module 106 may comprise suitable logic, circuitry, interfaces and/or code that may be operable to delay the signal received at the input and/or from the low-pass filter 105 of the comb notch filter 100 by a predetermined amount of time. In various embodiments, the exemplary delay module 106 illustrated in FIG. 5 shares various characteristics with the exemplary delay module 106 illustrated in FIG. 4 as described above. For example, the delay module 106 is configured to provide a predetermined amount of delay based on the fundamental hum frequency as described above with reference to FIG. 4. In an exemplary embodiment, the delay module 106 can be implemented by a finite impulse response (FIR) filter that also exhibits the appropriate low-pass filtering.

The summing module 108 may comprise suitable logic, circuitry, interfaces and/or code that may be operable to add the delayed signal provided by the low-pass filter 105 and delay module 106 on the side signal path 104 with the input signal received on the main signal path 102. The exemplary summing module 108 illustrated in FIG. 5 shares various characteristics with the exemplary summing module 108 illustrated in FIG. 4 as described above. The hum filtered output of the summing module 108 may be provided to hearing aid or cochlear implant processing devices for further processing before converting the audio signal to sound at a receiver. The comb notch filter 100 of FIG. 5 generates sharp nulls in the telecoil circuit frequency response at the odd harmonic frequencies below 1 kHz, but leaves the net frequency response above 1 kHz, where the strength of the hum harmonics is already weak, substantially unaffected. The reduction of the filtering action in high-frequency portion of the frequency range minimizes any audible artifacts.

Figure 6:
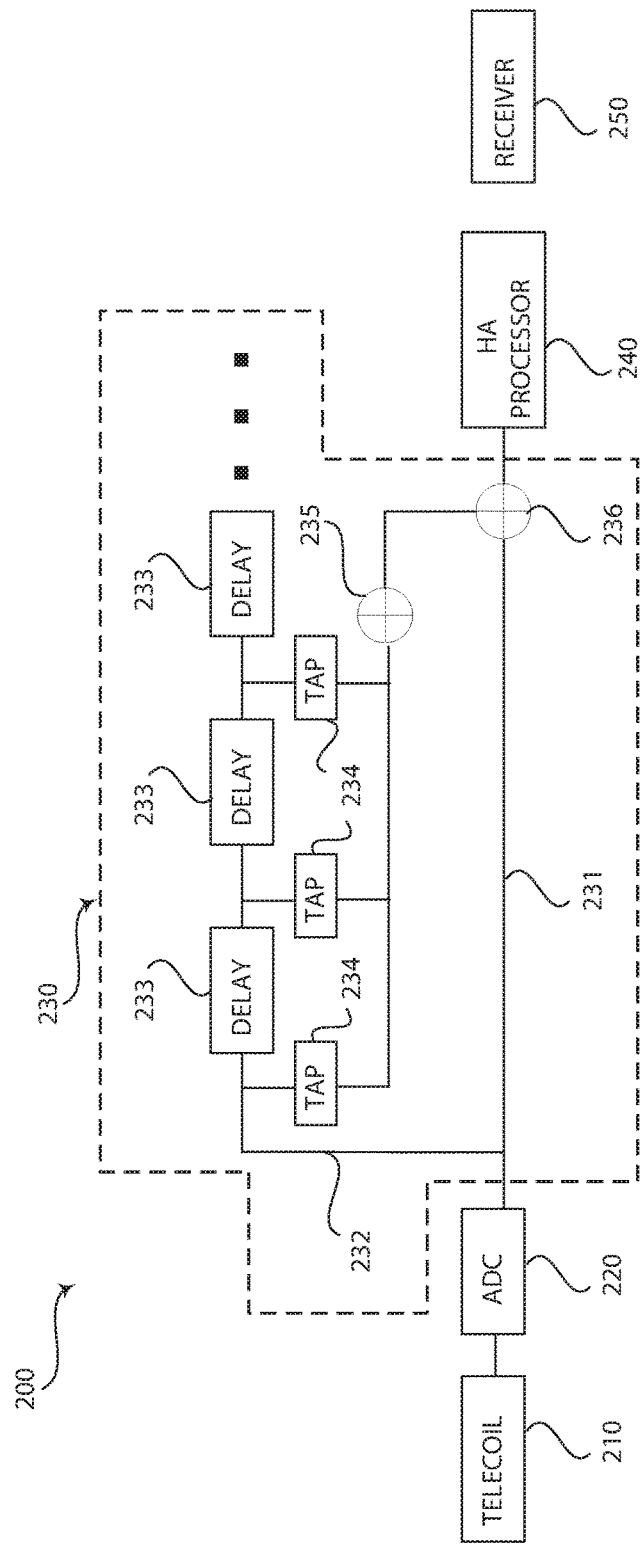
FIG. 6 is a block diagram of an exemplary hearing aid system having exemplary digital comb notch filter circuitry that is configured to provide enhanced listening of audio signals acquired via a telecoil by filtering hum, in accordance with various embodiments.

FIG. 6 is a block diagram of an exemplary hearing aid system 200 having exemplary digital comb notch filter circuitry 230 that is configured to provide enhanced listening of audio signals acquired via a telecoil 210 by filtering hum, in accordance with various embodiments. Referring to FIG. 6, the hearing aid system 200 comprises a telecoil 210, an analog-to-digital converter (ADC) 220, a comb notch filter 230, a hearing aid processor 240, and a receiver 250. The telecoil 210 is a small electromagnetic induction coil such as a wire wound around a magnetic bobbin that is configured to pick up magnetic signals. The telecoil 210 may be one audio input source for the hearing aid system 200. Other audio inputs may include a direct audio input, a microphone, or any suitable audio input. If the hearing aid system 200 is switched to a telecoil input source mode, the telecoil 210 receives magnetic signals and converts the magnetic signals to electrical audio signals.

The analog-to-digital converter (ADC) 220 may comprise suitable logic, circuitry, interfaces and/or code that may be operable to convert the analog audio signals from the telecoil 210 to corresponding digital signals. The ADC 220 is disposed between the telecoil and the comb notch filter 230. Notwithstanding, the invention is not limited in this regard. Accordingly, in some embodiments, the ADC 220 may be integrated within the telecoil 210 circuitry or the comb notch filter 230.

The comb notch filter 230 may comprise suitable logic, circuitry, interfaces and/or code that may be operable to generate sharp nulls in the telecoil circuit frequency response at the odd harmonic frequencies and attenuate the high-frequency portion to produce a hum filtered output. For example, the comb notch filter 230 may comprise an input, an output, a main signal path 231, a side signal path 232, a finite impulse response (FIR) filter 233, 234, 235, and a summing module 236. In various embodiments, the exemplary finite impulse response (FIR) filter 233, 234, 235 illustrated in FIG. 6 shares various characteristics with the exemplary digital FIR filter 105, 106 illustrated in FIG. 5 as described above. For example, the FIR filter 233, 234, 235 may be configured to provide the appropriate delay and low-pass filtering. The FIR filter may comprise a digital delay line having a number of delay elements or stages 233, filter taps 234, and a summing module 235.

The delay elements 233 of the digital delay line may comprise suitable logic, circuitry, interfaces and/or code that may be operable to provide sample-by-sample processing of the digital audio input signal. The delay elements 233 may be, for example, storage registers in a microprocessor, or any suitable digital signal processing component. The delay elements 233 may be configured to process the digital audio input signal at a sampling rate, such as 8 kHz, 16 kHz, or any suitable sampling rate. In an exemplary embodiment, the FIR filter may comprise 134 delay stages 233, each providing a delay of 125 μsec at an 8 kHz sampling rate to provide a net effective 8.33 msec delay based on a 60 Hz fundamental hum frequency. In various embodiments, the number of delay stages, amount of delay per stage, and sampling rate may be selected based on the fundamental hum frequency (e.g., 50 Hz or 60 Hz).

The filter taps 234 may comprise suitable logic, circuitry, interfaces and/or code that may be operable to apply filter coefficients to the digital audio input signal and the outputs of the delay stages 233. For example, the digital audio input signal and the output of each delay stage 233 is multiplied by a filter coefficient at the filter taps 234. The filter coefficients are dependent on the delay and filtering being applied. For example, a first set of coefficients may be applied for an 8.33 msec delay based on the 60 Hz fundamental hum frequency and a second set of coefficients may be applied for a 10 msec delay based on the 50 Hz fundamental hum frequency. In various embodiments, the filter coefficients may be switchable between the first set and the second set based on a determination of whether 50 Hz or 60 Hz filtering is appropriate. The values of the filter coefficients corresponding with the 50 Hz hum harmonics and the values of the filter coefficients corresponding with the 60 Hz hum harmonics are determinable by known techniques based on the desired low-pass filter and delay parameters of the FIR filter 233, 234, 235.

The summing module 235 may comprise suitable logic, circuitry, interfaces and/or code that may be operable to add the outputs of the filter taps 234 to generate a FIR filter output. The FIR filter output generated by the summing module 235 may be provided to the summing module 236 of the comb notch filter 230.

Figure 7:
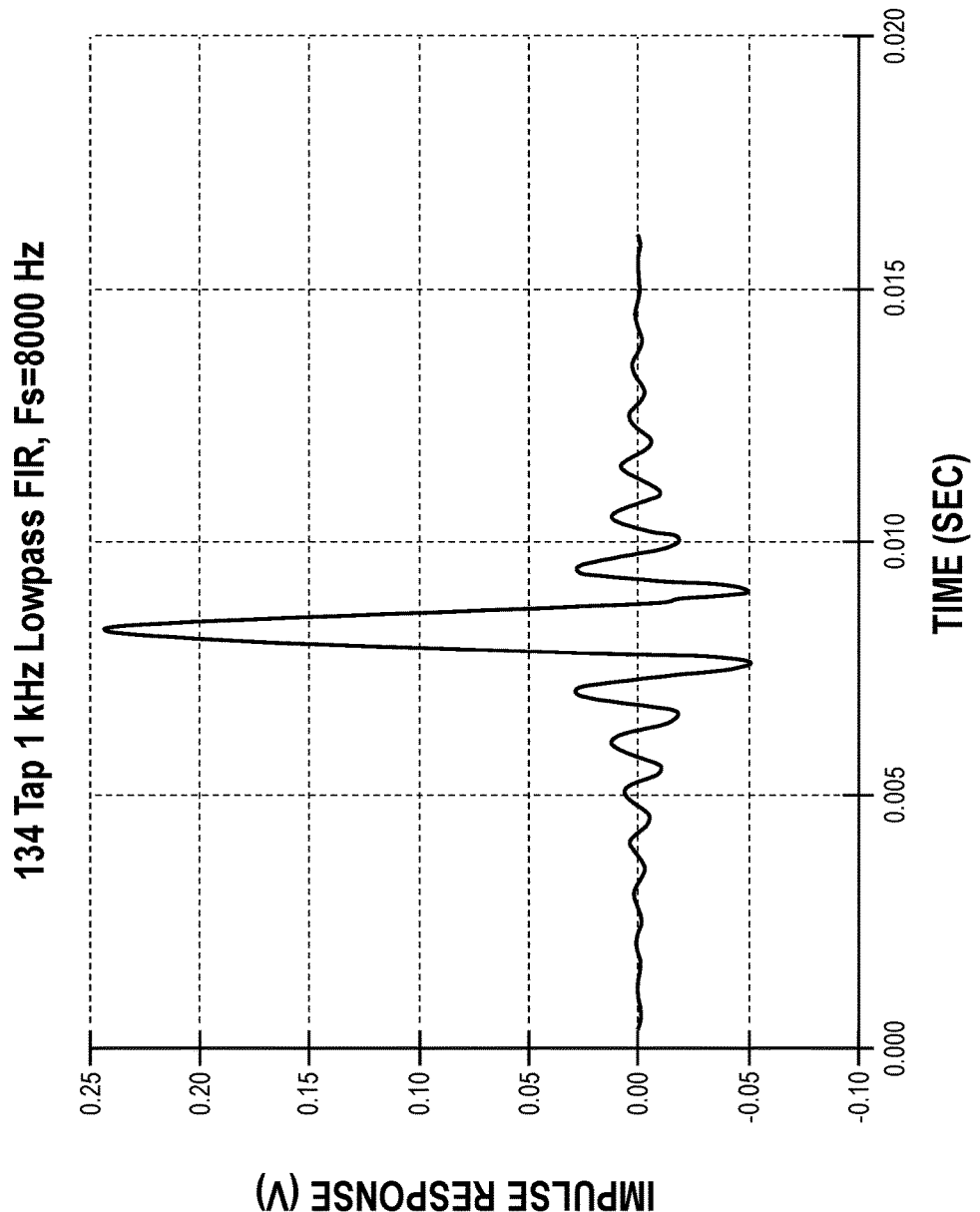
FIG. 7 is a graph of the impulse response of an exemplary digital finite impulse response (FIR) filter for use in a comb notch filter that is configured to provide enhanced listening of audio signals acquired via a telecoil by filtering hum, in accordance with certain embodiments.

FIG. 7 is a graph of the impulse response of an exemplary digital finite impulse response (FIR) filter 233, 234, 235 of a comb notch filter 230 that is configured to provide enhanced listening of audio signals acquired via a telecoil 210 by filtering hum, in accordance with certain embodiments. Referring to FIG. 7, the impulse response for an exemplary FIR delay/low-pass filter 233, 234, 235 operating at an 8 kHz sample rate is shown. The impulse response corresponds with the filter coefficients applied by the filter taps 234.

Referring again to FIG. 6, the summing module 236 of the comb notch filter 230 may comprise suitable logic, circuitry, interfaces and/or code that may be operable to add the delayed and low-pass filtered output provided by the FIR filter 233, 234, 235 on the side signal path 232 with the digital audio input signal received on the main signal path 231 to generate a hum filtered output. The hum filtered output of the summing module 236 may be provided to a hearing aid processor 240 for further processing before converting the audio signal to sound at a receiver 250.

Figure 8:
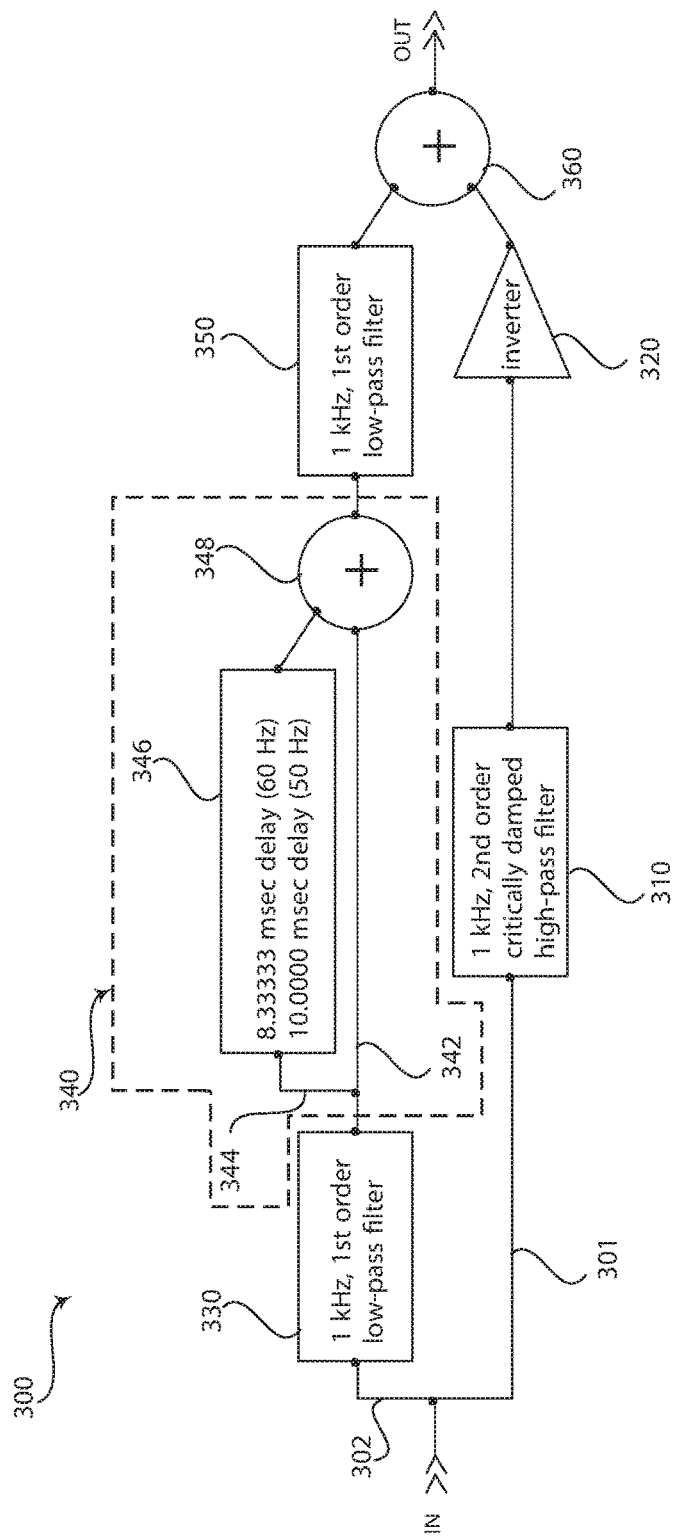
FIG. 8 is a block diagram of an exemplary telecoil hum filter having low-pass filters, high-pass filters, and a comb notch filter having a delay module, the exemplary telecoil hum filter being configured to provide enhanced listening of audio signals acquired via a telecoil, in accordance with various embodiments.

FIG. 8 is a block diagram of an exemplary telecoil hum filter 300 having low-pass filters 330, 350, high-pass filters 310, and a comb notch filter 340 having a delay module 346, the exemplary telecoil hum filter 300 being configured to provide enhanced listening of audio signals acquired via a telecoil, in accordance with various embodiments. Referring to FIG. 8, the telecoil hum filter 300 comprises an input, an output, a primary signal path 301, a secondary signal path 302, high-pass filter(s) 310, an inverter 320, low-pass filter(s) 330, 350, a comb notch filter 340, and a summing module 360.

The high-pass filter(s) 310 may comprise suitable logic, circuitry, interfaces and/or code that may be operable to filter out frequencies below 1 kHz, or any suitable cut-off frequency. The high-pass filter 310 receives audio input signals passed on the primary signal path 301 from the input of the telecoil hum filter 300. In an exemplary embodiment, the high-pass filter 310 filters out frequencies below 1 kHz, for example, and provides the high-pass filtered signal to an inverter 320. The inverter 320 may comprise suitable logic, circuitry, interfaces and/or code that may be operable to invert received signals. The inverter 320 may receive the high-pass filtered signal from the high-pass filter 310. The inverter 320 may invert the high-pass filtered signal and provide the inverted signal to the summing module 360.

The low-pass filter(s) 330, 350 may comprise suitable logic, circuitry, interfaces and/or code that may be operable to cut off frequencies above 1 kHz, or any suitable cut-off frequency. In an exemplary embodiment, the low-pass filter(s) 330, 350 may include a first low-pass filter 330 and a second low-pass filter 350 split before and after a comb notch filter 340. The first low-pass filter 330 may receive and filter an audio input signal from the input of the telecoil hum filter 300. The low-pass filtered signal may be provided to a comb-notch filter 340 operable to generate a comb filtered output. The second low-pass filter 350 may receive and filter the comb filtered output from the comb-notch filter 340. The output of the second low-pass filter 350 may be provided to the summing module 360. In various embodiments, the low-pass filters 330, 350 may each be first order low-pass filters. The low-pass filters 330, 350 may be split before and after the comb notch filter 340 to both minimize the amount of high-frequency extension that would otherwise be provided by the comb notch filter 340 and to attenuate high-frequency noise from the comb notch filter 340. Although FIG. 8 illustrates the low-pass filters 330, 350 positioned before and after the comb notch filter 340, for example, it is contemplated that the low-pass filtering may occur, before, after, before and after, and/or simultaneously with the comb notch filtering provided by the comb notch filter 340.

Although FIG. 8 illustrates (1) the high-pass filter 310 is a second order critically damped high-pass filter, (2) the low-pass filters 330, 350 are first-order low-pass filters, and (3) the inverter 320 is positioned in the primary signal path 301, for example, it is contemplated that the order of the filters 310, 330, 350 and the positioning and inclusion of the inverter 320 may be different. The order of the filters 310, 330, 350 and the positioning and inclusion of the inverter 320 are selected, for example, to maintain in-phase relationships of the non-delayed portions of the signals being combined at the summing module 360.

The comb-notch filter 340 may comprise suitable logic, circuitry, interfaces and/or code that may be operable to generate sharp attenuation notches in the frequency response of the low-pass filtered audio signal at the odd harmonic frequencies to produce a comb filtered output. The comb-notch filter 340 may comprise an input, an output, a main signal path 342, a side signal path 344, a delay module 346, and a summing module 348. The delay module 346 may comprise suitable logic, circuitry, interfaces and/or code that may be operable to delay, by a predetermined amount of time, the low-pass filtered audio signal received from the first low-pass filter 330 at the input of the comb notch filter 340. The delay module 346 is configured to provide a predetermined amount of delay based on the fundamental hum frequency (e.g., 50 Hz in Europe and most of Asia or 60 Hz in North America). The summing module 348 may comprise suitable logic, circuitry, interfaces and/or code that may be operable to add the delayed signal provided by the delay module 346 on the side signal path 344 with the low-pass filtered audio signal received on the comb filter main signal path 342. The comb filtered output of the summing module 348 may be provided to the second low-pass filter 350 as described above.

The summing module 360 may comprise suitable logic, circuitry, interfaces and/or code that may be operable to add the comb and low-pass filtered signal from the secondary signal path 302 with the high-pass filtered and inverted signal from the primary signal path 301. The telecoil hum filtered output of the summing module 360 may be provided to hearing aid or cochlear implant processing devices for further processing before converting the audio signal to sound at a receiver.

Figure 3:
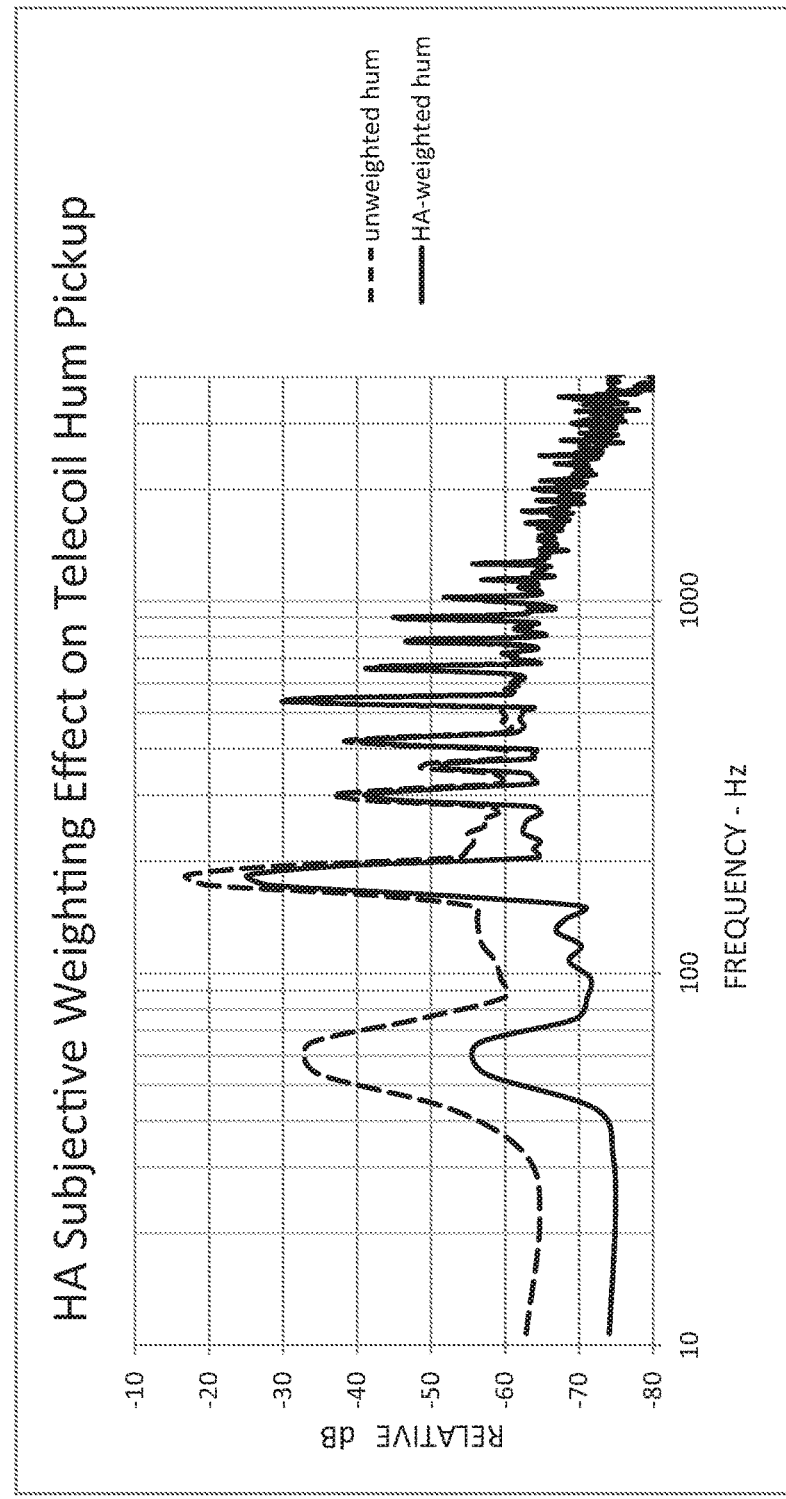
FIG. 3 is a graph of the frequency response of one of the exemplary stray magnetic hum fields picked up by a typical telecoil at the location in the indoor environment of FIG. 2 and the frequency response of the one exemplary stray magnetic hum field as perceived by a typical hearing aid user based on an applied weighting curve.
Figure 11:
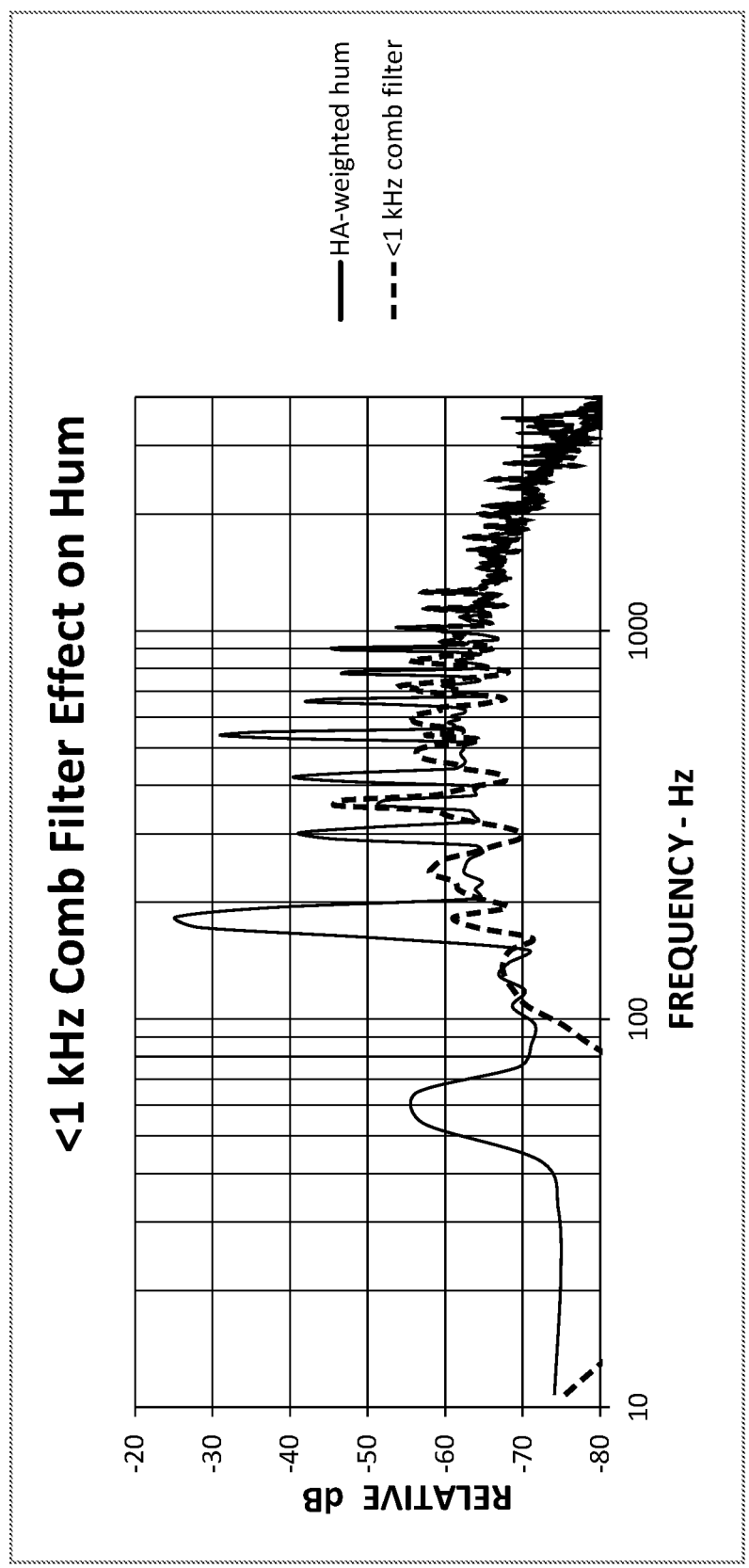
FIG. 11 is a graph of the frequency response of the weighted exemplary stray magnetic hum field as perceived by a typical hearing aid user of FIG. 3 and the frequency response of the weighted exemplary stray magnetic hum field after telecoil hum filtering is applied, in accordance with certain embodiments.

The telecoil hum filter 300 of FIG. 8 generates sharp nulls in the telecoil circuit frequency response at the odd harmonic frequencies of interest and reduces that filtering action in the high-frequency portion of the frequency range to produce the hum filtered output. The sharp attenuation notches at the odd harmonic hum frequencies and the reduction of the attenuation action in the high-frequency portion of the frequency range by the telecoil hum filter 300 of FIG. 8 is illustrated in FIG. 10. FIG. 10 is a graph of the frequency response generated by the comb notch filter of FIG. 4 and the frequency response generated by the telecoil hum filter of FIG. 8, in accordance with exemplary embodiments. Referring to FIG. 10, the sharp nulls in the lower part of the frequency range and reduced filtering action in the high frequency portion of the frequency range are shown as the "1 kHz low-pass side chain." The reduction of the filtering action in the high-frequency portion of the frequency range minimizes audible artifacts. FIG. 11 is a graph of the frequency response of the weighted exemplary stray magnetic hum field as perceived by a typical hearing aid of FIG. 3 and the frequency response of the weighted exemplary stray magnetic hum field after the telecoil hum filtering of FIG. 8 is applied, in accordance with certain embodiments. Referring to FIG. 11, the effect on the subjectively weighted hum spectrum, labeled as "HA-weighted hum," is shown as the "<1 kHz comb filter." The odd harmonics in the <1 kHz comb filter frequency response are largely canceled.

Figure 9A:
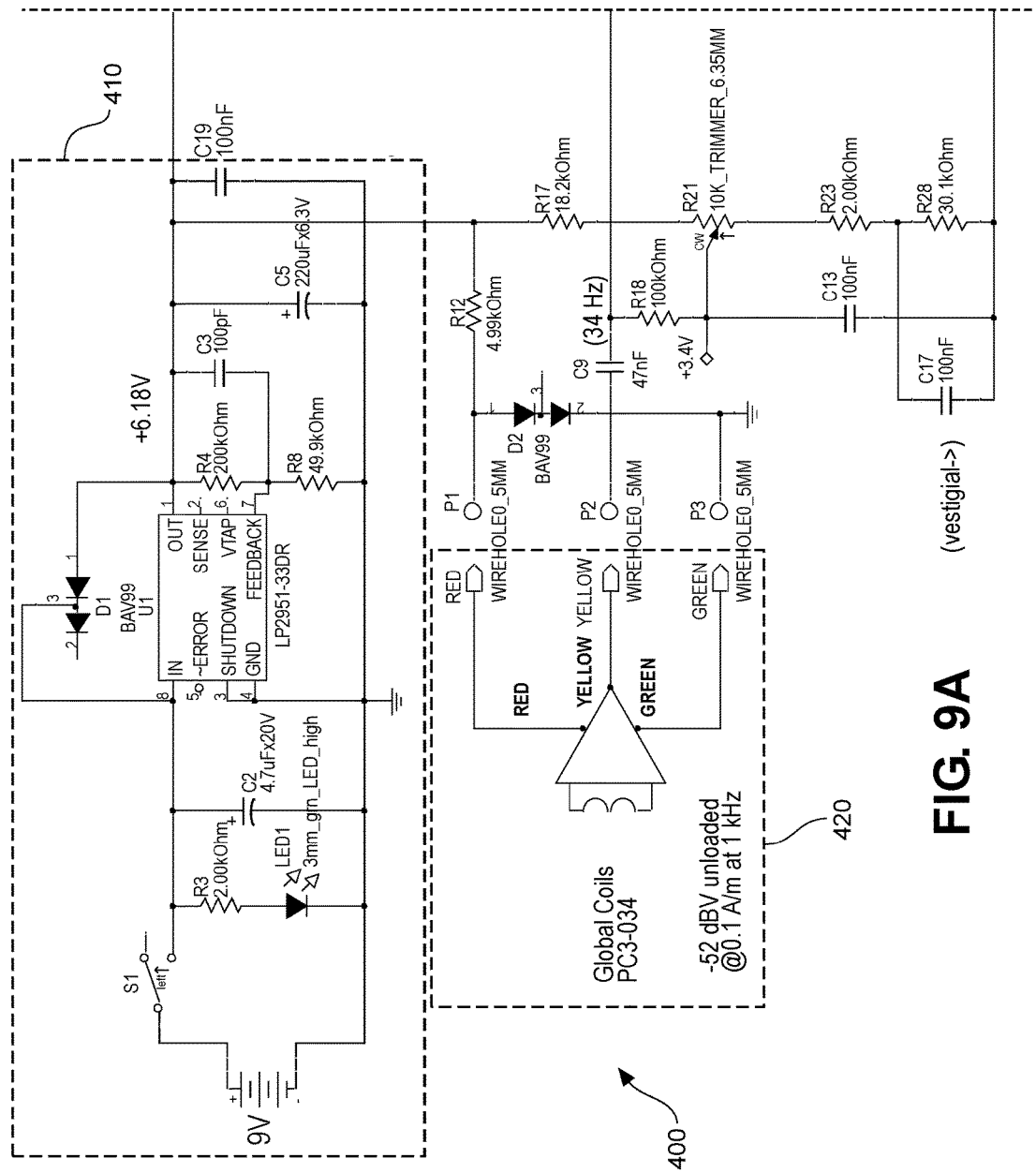
FIG. 9A is the first portion of the circuit diagram of an exemplary telecoil hum filter having low-pass filters, high-pass filters, and a comb notch filter having a delay module, the exemplary telecoil hum filter being configured to provide enhanced listening of audio signals acquired via a telecoil, in accordance with various embodiments.
Figure 9B:
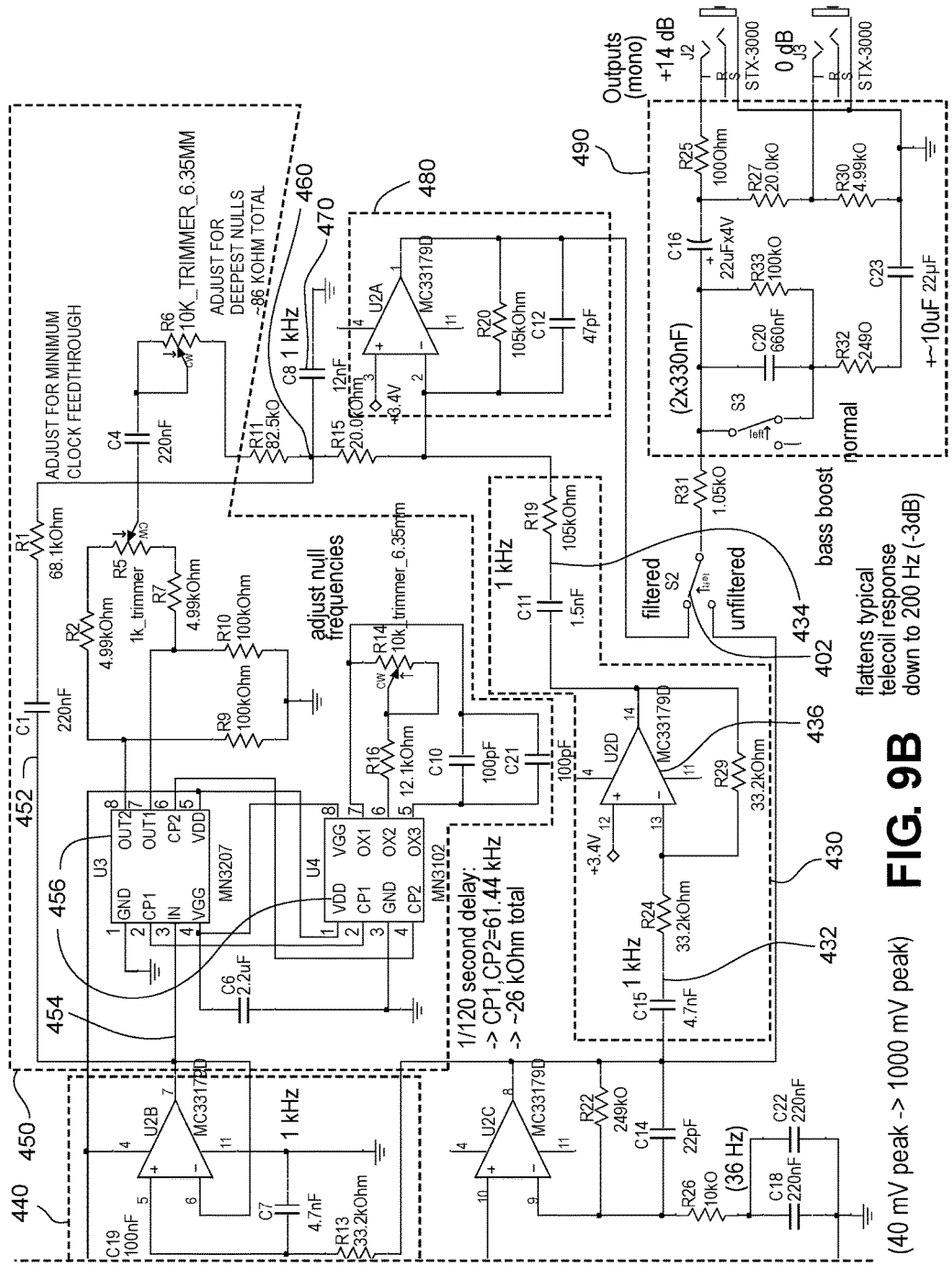
FIG. 9B is the second portion of the circuit diagram of the exemplary telecoil hum filter, in accordance with various embodiments.

FIG. 9 is a block diagram showing the relationship between a first portion of a circuit diagram illustrated in FIG. 9A and a second portion of the circuit diagram illustrated in FIG. 9B. FIG. 9A is the first portion of the circuit diagram of an exemplary telecoil hum filter 400 having low-pass filters 440, 470, high-pass filters 432, 434, and a comb notch filter 450, 460 having a delay module 456, the exemplary telecoil hum filter 400 being configured to provide enhanced listening of audio signals acquired via a telecoil 420, in accordance with various embodiments. FIG. 9B is the second portion of the circuit diagram of the exemplary telecoil hum filter, in accordance with various embodiments. Referring to FIGS. 9, 9A, and 9B, the telecoil hum filter 400 comprises a power source 410, telecoil 420, low-pass filters 440, 470, high-pass filters 432, 434, an inverter 436, a summing module 480, and a comb notch filter 450, 460. The power source 410 may be configured to provide power to the telecoil 420 and telecoil hum filter components. The telecoil 420 is a small electromagnetic induction coil configured to pick up electromagnetic signals. The telecoil 420 may be one audio input source for a hearing aid or cochlear implant. If the system is switched to a telecoil input source mode, the power source 410 may provide power to the telecoil hum filter 400, enabling the telecoil 420 to convert received magnetic signals to audio signals.

The audio signals output from the telecoil 420 may be amplified and provided to: (1) high-pass filter and inverter circuitry 430 on a primary signal path, and (2) low-pass filters 440, 470 and a comb notch filter 450, 460 on a secondary signal path. For example, on the primary signal path, the amplified audio input signal may be provided to a first high-pass filter 432, an inverter 436, and a second high-pass filter 434. The high-pass filters 432, 434 are configured to filter out frequencies below 1 kHz, or any suitable cut-off frequency. The inverter 320 may invert the high-pass filtered signal. The inverted and high-pass filtered output of the high-pass filter and inverter circuitry 430 is provided to the summing module 480. In various embodiments, the high-pass filter and inverter circuitry 430 of FIG. 9B may share various characteristics with the 1 kHz second order critically damped high-pass filter 310 and inverter 320 of FIG. 8.

Referring again to FIGS. 9, 9A, and 9B, on the secondary signal path, the amplified audio input signal may be provided to a first low-pass filter 440. The first low-pass filter 440 may be operable to cut off frequencies above 1 kHz, or any suitable cut-off frequency. The low-pass filtered signal may be provided to a comb notch filter 450 having a main signal path 452, a side signal path 454, a delay module 456, and a summing module 460. The low-pass filtered signal may be delayed at the delay module 456, which may be bucket brigade devices or any suitable delay circuitry. The delayed signal is added to the low-pass filtered signal from the main signal path 452 at node 460. The output of the comb notch filter 450, 460 is filtered by a second low-pass filter 470. The second low-pass filter 470 may be operable to cut off frequencies above 1 kHz, or any suitable cut-off frequency. In an exemplary embodiment, splitting the low-pass filtering before and after the comb notch filter 450 may minimize the amount of high-frequency extension that would otherwise be provided by the comb notch filter 450 and may attenuate high-frequency noise from the comb notch filter 450. In various embodiments, the first low-pass filter circuit 440, the comb notch filter circuitry 450, 460, and the second low-pass filter circuit 470 of FIG. 9B may share various characteristics with the first 1 kHz first order low-pass filter 330, the comb notch filter 340, and the second 1 kHz first order low-pass filter 350 of FIG. 8. Referring again to FIG. 9B, the low-pass filtered and delayed signal from the secondary signal path is summed at a summing circuit 480 with the output of the high-pass filter and inverter circuitry 430 from the primary signal path.

The output of the summing circuit 480 is a telecoil hum filtered signal. The telecoil hum filter 400 of FIGS. 9, 9A, and 9B generates sharp nulls in the telecoil circuit frequency response at the odd harmonic frequencies of interest and reduces the filtering action in the high-frequency portion of the frequency range to produce the telecoil hum filtered signal. The reduction of the filtering action in the high-frequency portion of the frequency range reduces the filtering with increasing frequency so as to minimize audible artifacts.

In various embodiments, the telecoil hum filter 400 may include frequency dependent attenuation circuitry 490 that is configured to selectively provide the equivalent of a bass boost. For example, in a normal operating mode, the frequency dependent attenuation circuitry 490 may be configured to attenuate high and low frequency portions of the audio signal. In a selectable bass boost mode, however, the frequency dependent attenuation circuitry 490 attenuates high frequencies without attenuating lower frequencies to provide the equivalent of a bass boost. The bass boost mode may be selected via a switch or any suitable selection mechanism. The hum filtered and optionally bass boosted output of the telecoil hum filter 400 may be provided to a hearing aid or cochlear implant processor for further processing before converting the audio signal to sound at a receiver.

In an exemplary embodiment, the telecoil hum filter 400 may include a switch 402 for bypassing the filtering circuitry and providing the unfiltered audio input signal to additional processing components, such as frequency dependent attenuation circuitry 490, a hearing aid processor, a cochlear implant processor, or any suitable processor. For example, the hearing aid or cochlear implant processor may analyze the filtered and unfiltered audio input signal and determine the need of the filtering action. The filtered signal could be compared to the unfiltered signal during speech or sound pauses to note significant differences in overall level (showing hum present) or at specific hum frequencies. The processor may automatically insert and/or remove the filtering action based on the automatic determination of need, or in proportion to the determination of need.

In various embodiments, a hearing aid processor or cochlear implant processor may automatically determine and select the appropriate delay of the delay module. For example, the processor may periodically switch between an 8.33 msec delay and a 10 msec delay and compare the results to determine the appropriate delay.

Figure 12:
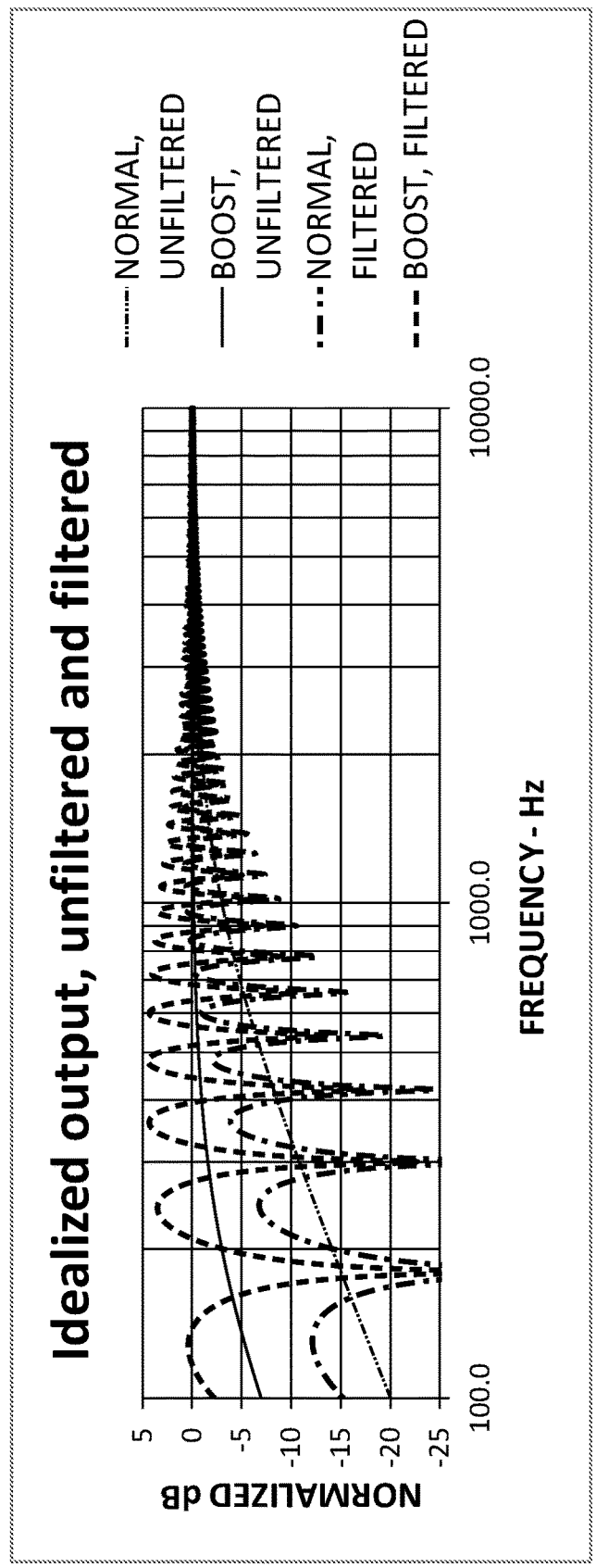
FIG. 12 is a graph of the typical telecoil frequency response with and without hum filtering, and the boosted telecoil frequency response with and without hum filtering, in accordance with certain embodiments.

The near-elimination of hum allows for the boosting of the low frequency response of the telecoil for a fuller sound from wide-band magnetic sources such as room loops adjusted according to IEC 60118-4. As noted above, the typical response of a telecoil relative to a constant magnetic field strength rolls off at 6 dB/octave below typically 1 kHz. This characteristic not only reduces hum pickup, but also mates well with telephone receivers, whose magnetic emanations show a very roughly complementary downwards slope with frequency over the narrowband speech frequency range. Room loops, however, are not currently adjusted to have a frequency response that is complementary to typical telecoils. The response of telecoils to standard room loops, which are specified from 100 Hz to 5 kHz, is typically thin and bass-shy. FIG. 12 is a graph of the typical telecoil frequency response with and without hum filtering, and the boosted telecoil frequency response with and without hum filtering, in accordance with certain embodiments. Referring to FIG. 12, a typical telecoil response to the constant magnetic field strength produced by a standard room loop is labeled as "Normal, unfiltered" and the telecoil frequency response with hum filtering is labeled as "Normal, filtered." The net result when equalization is added to boost the lower frequencies of the telecoil to flatten the response down to 200 Hz is labeled as "Boost, unfiltered." The boosted telecoil frequency response with hum filtering is labeled as "Boost, filtered." Without the effective hum filtering, any hum present would also be boosted, making telecoil response equalization impractical in practice. However, the boosted, filtered response shown in FIG. 12 is practical, resulting in a much fuller sound on voice and, especially dramatically, on music.

Figure 13:
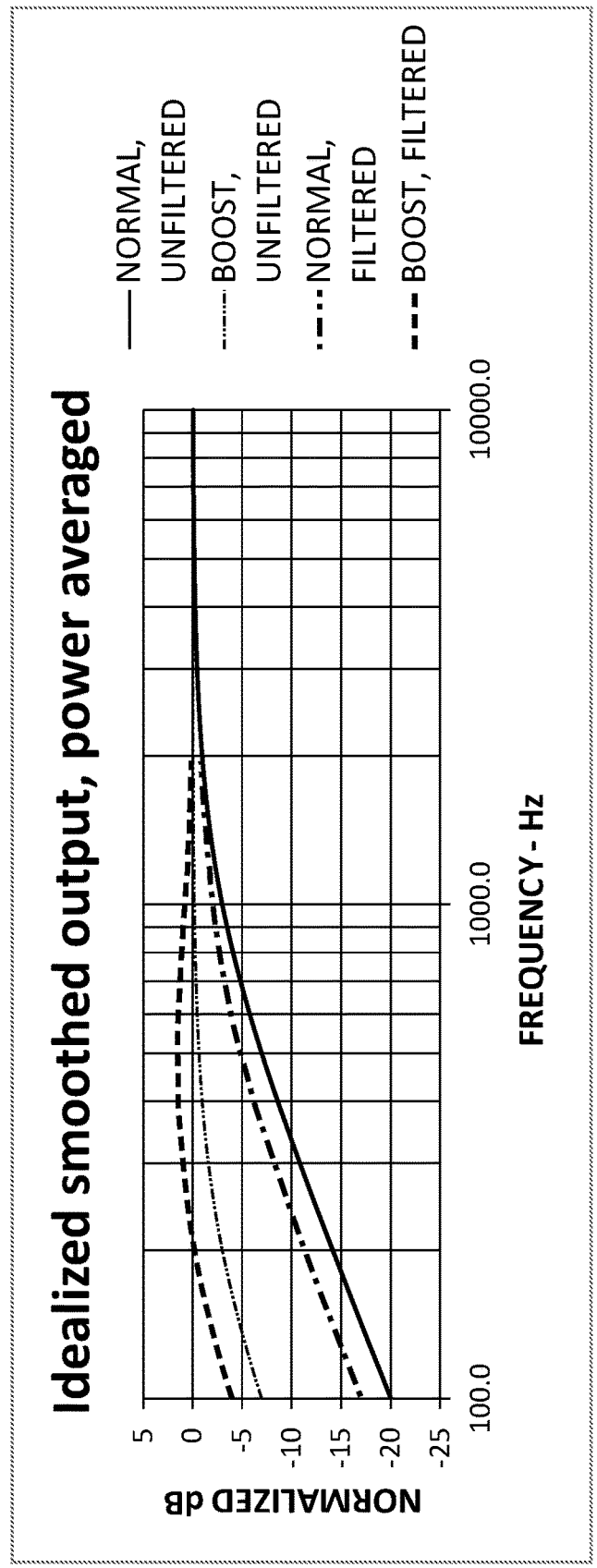
FIG. 13 is a graph corresponding with FIG. 12, where the hum filtered typical telecoil frequency response and the hum filtered boosted telecoil frequency response have been smoothed and power averaged, in accordance with certain embodiments.

FIG. 13 is a graph corresponding with FIG. 12, where the hum filtered typical telecoil frequency response and the hum filtered boosted telecoil frequency response have been smoothed and power averaged, in accordance with certain embodiments. Referring to FIG. 13, it is shown that when hum filtering is applied, the overall frequency-averaged response is slightly boosted. In various embodiments, the minor response shift provided by performing hum filtering may be accepted or incorporated into any applied equalization.

Figure 14:
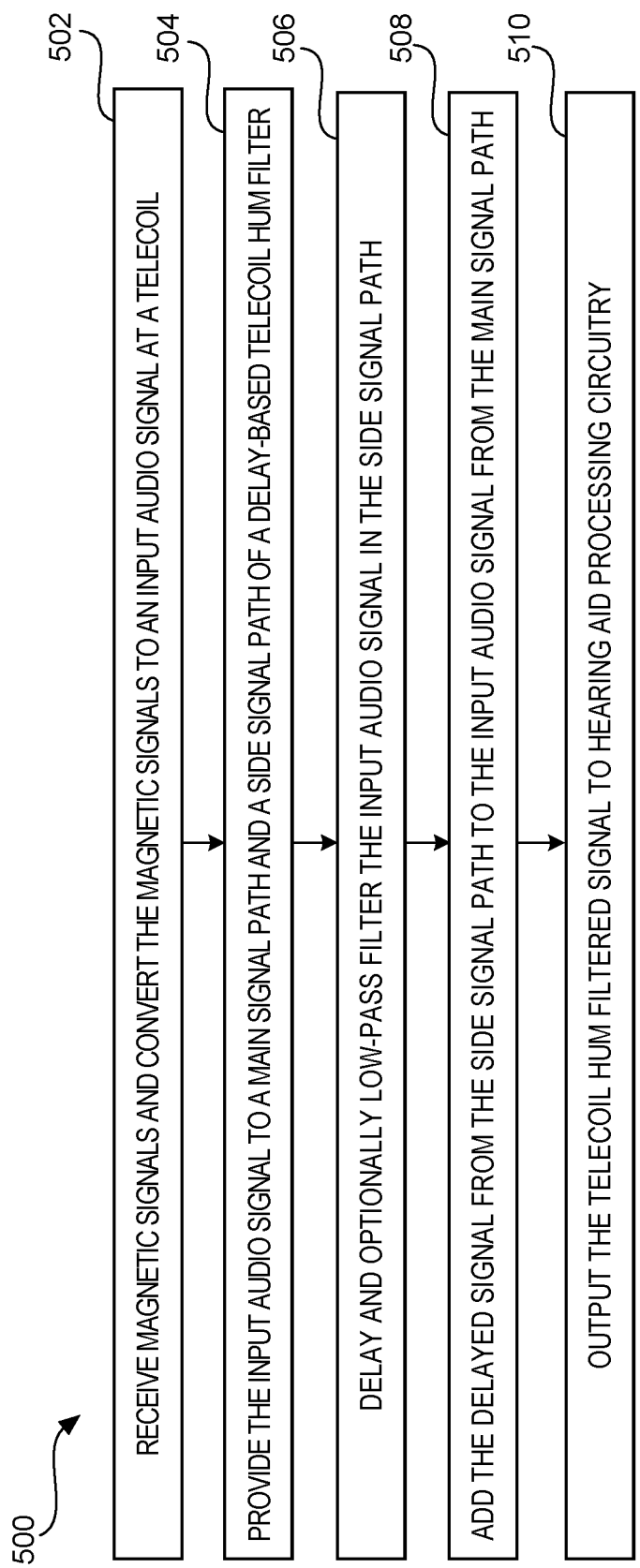
FIG. 14 is a flow chart illustrating exemplary steps that may be utilized for providing enhanced listening of audio signals acquired via a telecoil by filtering hum, in accordance with various embodiments.

FIG. 14 is a flow chart 500 illustrating exemplary steps 502-510 that may be utilized for providing enhanced listening of audio signals acquired via a telecoil 210, 420 by filtering hum, in accordance with various embodiments. Referring to FIG. 14, there is shown a flow chart 500 comprising exemplary steps 502 through 510. Certain embodiments of the present invention may omit one or more of the steps, and/or perform the steps in a different order than the order listed, and/or combine certain steps discussed below. For example, some steps may not be performed in certain embodiments. As another example, certain steps may be performed in a different temporal order, including simultaneously, than listed below.

In step 502, magnetic signals are received at a telecoil 210, 420 and converted to input audio signals. For example, a hearing aid or cochlear implant may have a number of audio input devices, such as a direct audio input, a microphone, and a telecoil 210, 420. The hearing aid or cochlear implant may include, for example, a switch for selecting a telecoil audio input mode. The telecoil may be a small electromagnetic induction coil configured to pick up electromagnetic signals. If the hearing aid system 200 is switched to a telecoil input source mode, the telecoil 210 may receive magnetic signals and convert the magnetic signals to input audio signals.

In step 504, the input audio signals are provided to a telecoil hum filter 100, 200, 300, 400 having a comb notch filter 100, 230, 340, 450. The telecoil hum filter 100, 200, 300, 400 may be a comb notch filter 100, 230, 340, 450 and/or may include a comb notch filter 100, 230, 340, 450 and one or more low-pass filters 330, 350, 440, 470 and/or high-pass filters 310, 432, 434. The comb notch filter 100, 230, 340, 450 may include a main signal path 102, 231, 301, 452 and a side signal path 104, 232, 302, 454. The input audio signal may be provided to both the main signal path 102, 231, 301, 452 and the side signal path 104, 232, 302, 454. In various embodiments, the input audio signal may be filtered by low-pass filter(s) 330, 440 prior to inputting the audio input signal to the comb notch filter 100, 230, 340, 450.

In step 506, the comb notch filter 100, 230, 340, 450 delays, and optionally low-pass filters, the input audio signal in the side signal path 104, 232, 302, 454. For example, the side signal path 104, 232, 302, 454 of the comb notch filter 100, 230, 340, 450 may comprise a delay module 106, 233, 346, 456 and optionally, low-pass filter(s) 105, 234. In various embodiments, the delay module 106, 233, 346, 456 and low-pass filter(s) 105, 234 may form a digital finite input response filter. The low-pass filter(s) 105, 234 may be configured to cut off frequencies above 1 kHz, or any suitable cut-off frequency, of the signal received at the input of the comb notch filter 100, 230, 340, 450. The low-pass filtering, if performed, may occur, before, after, before and after, and/or simultaneously with the delay provided by the delay module 106, 233, 346, 456. The delay module 106, 233, 346, 456 may be configured to delay the signal received at the input and/or from the low-pass filter 105 of the comb notch filter 100 by a predetermined amount of time based on the fundamental hum frequency. For example, the delay may be 8.33 msec for a 60 Hz fundamental hum frequency and 10 msec for a 50 Hz fundamental hum frequency. In certain embodiments, the appropriate delay may be automatically detected and set by a processing component of the hearing aid or cochlear implant. For example, the processing component may periodically switch between an 8.33 msec delay and a 10 msec delay and compare the results to determine the appropriate delay.

In step 508, the comb notch filter 100, 230, 340, 450 adds the delayed signal from the side signal path 104, 232, 302, 454 to the input audio signal from the main signal path 102, 231, 301, 452 to generate a comb filtered output signal. For example, the comb notch filter 100, 230, 340, 450 may comprise a summing module 108, 236, 348, 460 configured to add the signals from the main signal path 102, 231, 301, 452 and the side signal path 104, 232, 302, 454. In various embodiments, the comb filtered output signal may be the output of the telecoil hum filter 100, 200, 300, 400. Additionally and/or alternatively, the comb filtered output signal may undergo further processing such as being filtered by a low-pass filter 350, 470 and/or added to a version of the input audio signal that was passed through high-pass filter(s) 310, 432, 434 and an inverter 320, 436.

In step 510, the telecoil hum filtered signal is provided to processing circuitry and/or a receiver for further processing and conversion to sound. For example, the output of the telecoil hum filter 100, 200, 300, 400 may be provided to frequency dependent attenuation circuitry 490, a hearing aid processor 240, and/or a cochlear implant processor. For example, frequency dependent attenuation circuitry 490 may be configured to selectively provide the equivalent of a bass boost. As another example, the hearing aid or cochlear implant processor 240 may provide additional digital signal processing techniques to further condition the audio signal. The processed audio signal may be provided to a receiver 250 that converts the audio signal to sound.

Aspects of the present invention provide a method 500 and system 100, 200, 300, 400 for providing enhanced listening of audio signals acquired via a telecoil 210, 420 by performing hum filtering. In accordance with various embodiments, the system 100, 200, 300, 400 comprises a telecoil 210, 420 operable to receive a magnetic signal and convert the magnetic signal to an input audio signal. The system 100, 200, 300, 400 comprises a telecoil hum filter 100, 200, 300, 400 a comb notch filter 100, 230, 340, 450. The comb notch filter 100, 230, 340, 450 comprises a delay module 106, 233, 346, 456 and a comb notch filter summing module 108, 236, 348, 460. The delay module 106, 233, 346, 456 is configured to generate a delayed signal by applying a delay to the input audio signal. The delay is based on a fundamental hum frequency. The comb notch filter summing module 108, 236, 348, 460 is configured to generate a comb notch filter output signal by adding the input audio signal and the delay signal.

In various embodiments, the comb notch filter 100, 230, 340, 450 comprises a low-pass filter 105, 234 configured to filter the input audio signal. In certain embodiments, the low-pass filter 105, 234 comprises a cutoff frequency of 1 kHz. In a representative embodiment, the delay module 106, 233, 346, 456 and the low-pass filter 105, 234 form a digital finite impulse response filter. In various embodiments, the digital finite impulse response filter 105, 106, 233, 234, 235 comprises a digital delay line, a plurality of filter taps 234, and a finite impulse response filter summing module 235. The digital delay line comprises a plurality of delay elements 233 configured to delay a sample of the input audio signal Each of the plurality of filter taps 234 is configured to apply a filter coefficient to one of the input audio signal or an output of one of the plurality of delay elements 233. The finite impulse response filter summing module 235 is configured to add the outputs of the filter taps 234 to generate the delayed signal.

In certain embodiments, the delay is equal to $$\frac{1}{2*freq}$$

where freq is the fundamental hum frequency. In a representative embodiment, the telecoil hum filter 100, 200, 300, 400 comprises a primary signal path 301, a secondary signal path 302, a high-pass filter 310, 432, 434, at least one low-pass filter 330, 350, 440, 470, and a telecoil hum filter summing module 360, 480. The high-pass filter 310, 432, 434 is on the primary signal path 301 and is configured to filter the input audio signal to provide a high-pass filtered input audio signal. The at least one low-pass filter 330, 350, 440, 470 is on the secondary signal path 302 and is configured to filter one or more of the input audio signal and the comb notch filter output signal. A combination of the at least one low-pass filter 330, 350, 440, 470 and the comb notch filter 100, 230, 340, 450 generate a secondary signal path input audio signal. The telecoil hum filter summing module 360, 480 is configured to add the high-pass filtered input audio signal and the secondary signal path input audio signal to generate a telecoil hum filtered signal.

In a representative embodiment, the telecoil hum filter 100, 200, 300, 400 comprises an inverter 320, 436 configured to invert one of the secondary signal path input audio signal or the high-pass filtered input audio signal. In various embodiments, the at least one low-pass filter 330, 350, 440, 470 comprises a first low-pass filter 330, 440 and a second low-pass filter 350, 470. The first low-pass filter 330, 440 is on the secondary signal path 302 and is configured to filter the input audio signal to generate a low-pass filtered input audio signal. The low-pass filtered input audio signal is provided as the input audio signal to the comb notch filter 100, 230, 340, 450. The second low-pass filter 350, 470 is on the secondary signal path 302 and is configured to filter the comb notch filter output signal to provide the secondary signal path input audio signal.

Various embodiments provide a method 500 for providing enhanced listening of audio signals acquired via a telecoil 210, 420 by performing hum filtering. The method 500 comprises receiving 502 a magnetic signal at a telecoil 210, 420. The method 500 comprises converting 502 the magnetic signal to an input audio signal at the telecoil 210, 420. The method 500 comprises generating 504, 506 a delayed signal at a delay module 106, 233, 346, 456 of a comb notch filter 100, 230, 340, 450. The delayed signal is generated by applying a delay to the input audio signal. The delay is based on a fundamental hum frequency. The method 500 comprises generating 508, 510 a comb notch filter output signal at a comb notch filter summing module 108, 236, 348, 460 by adding the input audio signal and the delay signal.

In certain embodiments, the method 500 comprises filtering 506 the input audio signal at a low-pass filter 105, 234 of the comb notch filter 100, 230, 340, 450. In a representative embodiment, the applying 506 the delay to the input audio signal and the filtering 506 the input audio signal comprises delaying a sample of the input audio signal by each of a plurality of delay elements 233 of a digital delay line. The applying 506 the delay to the input audio signal and the filtering 506 the input audio signal comprises applying a filter coefficient by each of a plurality of filter taps 234. The filter coefficient is applied to one of the input audio signal or an output of one of the plurality of delay elements 233. The applying 506 the delay to the input audio signal and the filtering 506 the input audio signal comprises adding, by a finite impulse response filter summing module 235, the outputs of the filter taps 234 to generate the delayed signal.

In various embodiments, the delay is equal to $$\frac{1}{2*freq}$$

where freq is the fundamental hum frequency. In certain embodiments, the method 500 comprises filtering, by a high-pass filter 310, 432, 434 on a primary signal path 301, the input audio signal to provide a high-pass filtered input audio signal. The method 500 comprises filtering, by at least one low-pass filter 330, 350, 440, 470 on a secondary signal path 302, one or more of the input audio signal and the comb notch filter output signal. A combination of the at least one low-pass filter 330, 350, 440, 470 and the comb notch filter 100, 230, 340, 450 generate a secondary signal path input audio signal. The method 500 comprises adding, by a teleooil hum filter summing module 360, 480, the high-pass filtered input audio signal and the secondary signal path input audio signal to generate a telecoil hum filtered signal.

In a representative embodiment, the method 500 comprises inverting, by an inverter 320, 436, one of the secondary signal path input audio signal or the high-pass filtered input audio signal. In various embodiments, the filtering by the at least one low-pass filter 330, 350, 440, 470 comprises filtering, by a first low-pass filter 330, 440 on the secondary signal path 302, the input audio signal to generate a low-pass filtered input audio signal. The low-pass filtered input audio signal is provided as the input audio signal to the comb notch filter 100, 230, 340, 450. The filtering by the at least one low-pass filter 330, 350, 440, 470 comprises filtering, by a second low-pass filter 350, 470 on the secondary signal path 302, the comb notch filter output signal to provide the secondary signal path input audio signal. In certain embodiments, the method 500 comprises selectively providing a bass boost to the comb notch filter output signal. In various embodiments, the method 500 comprises comparing the input audio signal and the comb notch filter output signal. The method 500 comprises selecting one of the input audio signal or the comb notch filter output signal based on the comparison.

Certain embodiments provide a non-transitory computer readable medium having stored thereon, a computer program having at least one code section. The at least one code section is executable by a machine for causing the machine to perform steps. The steps 500 include receiving 504 an input audio signal from a telecoil 210, 420. The steps 500 include generating 506 a delayed signal at a delay module 106, 233, 346, 456 of a comb notch filter 100, 230, 340, 450. The delayed signal is generated by applying a delay to the input audio signal. The delay is based on a fundamental hum frequency. The steps 500 include generating 508, 510 a comb notch filter output signal at a comb notch filter summing module 108, 236, 348, 460 by adding the input audio signal and the delay signal.

In various embodiments, the steps 500 include filtering the input audio signal at a low-pass filter 105, 234 of the comb notch filter 100, 230, 340, 450. The applying 506 the delay to the input audio signal and the filtering 506 the input audio signal comprises delaying a sample of the input audio signal by each of a plurality of delay elements 233 of a digital delay line. The applying 506 the delay to the input audio signal and the filtering 506 the input audio signal comprises applying a filter coefficient by each of a plurality of filter taps 234, wherein the filter coefficient is applied to one of the input audio signal or an output of one of the plurality of delay elements 233. The applying 506 the delay to the input audio signal and the filtering 506 the input audio signal comprises adding, by a finite impulse response filter summing module 235, the outputs of the filter taps 234 to generate the delayed signal.

In a representative embodiment, the steps 500 include filtering, by a high-pass filter 310, 432, 434 on a primary signal path 301, the input audio signal to provide a high-pass filtered input audio signal. The steps 500 include filtering, by at least one low-pass filter 330, 350, 440, 470 on a secondary signal path 302, one or more of the input audio signal and the comb notch filter output signal. A combination of the at least one low-pass filter 330, 350, 440, 470 and the comb notch filter 100, 230, 340, 450 generate a secondary signal path input audio signal. The steps 500 include adding, by a telecoil hum filter summing module 360, 480, the high-pass filtered input audio signal and the secondary signal path input audio signal to generate a telecoil hum filtered signal. In certain embodiments, the delay is equal to $$\frac{1}{2*freq}$$

where freq is the fundamental hum frequency.

As utilized herein the term "circuitry" refers to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled, by some user-configurable setting.

Other embodiments of the invention may provide a computer readable device and/or a non-transitory computer readable medium, and/or a machine readable device and/or a non-transitory machine readable medium, having stored thereon, a machine code and/or a computer program having at least one code section executable by a machine and/or a computer, thereby causing the machine and/or computer to perform the steps as described herein for providing enhanced listening of audio signals acquired via a telecoil by performing hum filtering.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A system comprising:
   a telecoil operable to receive a magnetic signal and convert the magnetic signal to an input audio signal; and
   a telecoil hum filter comprising:
      a primary signal path;
      a secondary signal path;
      a high-pass filter on the primary signal path configured to filter the input audio signal to provide a high-pass filtered input audio signal;
      a comb notch filter comprising:
         a delay module configured to generate a delayed signal by applying a delay to the input audio signal, wherein the delay is based on a fundamental hum frequency, and
         a comb notch filter summing module configured to generate a comb notch filter output signal by adding the input audio signal and the delay signal;
      at least one low-pass filter on the secondary signal path configured to filter one or more of the input audio signal and the comb notch filter output signal, wherein a combination of the at least one low-pass filter and the comb notch filter generate a secondary signal path input audio signal; and
      a telecoil hum filter summing module configured to add the high-pass filtered input audio signal and the secondary signal path input audio signal to generate a telecoil hum filtered signal.

2. The system of claim 1, wherein the comb notch filter comprises a low-pass filter configured to filter the input audio signal.

3. The system of claim 2, wherein the low-pass filter comprises a cutoff frequency of 1 kHz.

4. The system of claim 2, wherein the delay module and the low-pass filter form a digital finite impulse response filter.

5. The system of claim 4, wherein the digital finite impulse response filter comprises:
   a digital delay line having a plurality of delay elements configured to delay a sample of the input audio signal;
   a plurality of filter taps, each of the plurality of filter taps configured to apply a filter coefficient to one of the input audio signal or an output of one of the plurality of delay elements, and
   a finite impulse response filter summing module configured to add the outputs of the filter taps to generate the delayed signal.

6. The system of claim 1, wherein the delay is equal to:

$$\frac{1}{2*freq}$$

where freq is the fundamental hum frequency.

7. The system of claim 1, wherein the telecoil hum filter comprises an inverter configured to invert one of the secondary signal path input audio signal or the high-pass filtered input audio signal.

8. The system of claim 1, wherein the at least one low-pass filter comprises:
   a first low-pass filter on the secondary signal path configured to filter the input audio signal to generate a low-pass filtered input audio signal, wherein the low-pass filtered input audio signal is provided as the input audio signal to the comb notch filter; and a second low-pass filter on the secondary signal path configured to filter the comb notch filter output signal to provide the secondary signal path input audio signal.

9. A method comprising:

receiving a magnetic signal at a telecoil;

converting the magnetic signal to an input audio signal at the telecoil;

filtering, by a high-pass filter on a primary signal path, the input audio signal to provide a high-pass filtered input audio signal;

generating a delayed signal at a delay module of a comb notch filter, wherein the delayed signal is generated by applying a delay to the input audio signal, wherein the delay is based on a fundamental hum frequency;

generating a comb notch filter output signal at a comb notch filter summing module by adding the input audio signal and the delay signal;

filtering, by at least one low-pass filter on a secondary signal path, one or more of the input audio signal and the comb notch filter output signal, wherein a combination of the at least one low-pass filter and the comb notch filter generate a secondary signal path input audio signal; and adding, by a telecoil hum filter summing module, the high-pass filtered input audio signal and the secondary signal path input audio signal to generate a telecoil hum filtered signal.

10. The method of claim 9, comprising filtering the input audio signal at a low-pass filter of the comb notch filter.

11. The method of claim 10, wherein the applying the delay to the input audio signal and the filtering the input audio signal comprises:

delaying a sample of the input audio signal by each of a plurality of delay elements of a digital delay line;

applying a filter coefficient by each of a plurality of filter taps, wherein the filter coefficient is applied to one of the input audio signal or an output of one of the plurality of delay elements; and adding, by a finite impulse response filter summing module, the outputs of the filter taps to generate the delayed signal.

12. The method of claim 9, wherein the delay is equal to:

$$\frac{1}{2*freq}$$

where freq is the fundamental hum frequency.

13. The method of claim 9, comprising inverting, by an inverter, one of the secondary signal path input audio signal or the high-pass filtered input audio signal.

14. The method of claim 9, wherein the filtering by the at least one low-pass filter comprises:

filtering, by a first low-pass filter on the secondary signal path, the input audio signal to generate a low-pass filtered input audio signal, wherein the low-pass filtered input audio signal is provided as the input audio signal to the comb notch filter; and filtering, by a second low-pass filter on the secondary signal path, the comb notch filter output signal to provide the secondary signal path input audio signal.

15. The method of claim 9, comprising selectively providing a bass boost to the comb notch filter output signal.

16. The method of claim 9, comprising:

comparing the input audio signal and the comb notch filter output signal; and selecting one of the input audio signal or the comb notch filter output signal based on the comparison.

17. A non-transitory computer readable medium having stored thereon, a computer program having at least one code section, the at least one code section being executable by a machine for causing the machine to perform steps comprising:

receiving an input audio signal from a telecoil;

filtering, by a high-pass filter on a primary signal path, the input audio signal to provide a high-pass filtered input audio signal;

generating a delayed signal at a delay module of a comb notch filter, wherein the delayed signal is generated by applying a delay to the input audio signal, wherein the delay is based on a fundamental hum frequency;

generating a comb notch filter output signal at a comb notch filter summing module by adding the input audio signal and the delay signal;

filtering, by at least one low-pass filter on a secondary signal path, one or more of the input audio signal and the comb notch filter output signal, wherein a combination of the at least one low-pass filter and the comb notch filter generate a secondary signal path input audio signal; and adding, by a telecoil hum filter summing module, the high-pass filtered input audio signal and the secondary signal path input audio signal to generate a telecoil hum filtered signal.

18. The non-transitory computer readable medium of claim 17, comprising filtering the input audio signal at a low-pass filter of the comb notch filter, wherein the applying the delay to the input audio signal and the filtering the input audio signal comprises:

delaying a sample of the input audio signal by each of a plurality of delay elements of a digital delay line;

applying a filter coefficient by each of a plurality of filter taps, wherein the filter coefficient is applied to one of the input audio signal or an output of one of the plurality of delay elements; and adding, by a finite impulse response filter summing module, the outputs of the filter taps to generate the delayed signal.

19. The non-transitory computer readable medium of claim 17, wherein the delay is equal to:

$$\frac{1}{2*freq}$$

where freq is the fundamental hum frequency.

* * * * *